United States Patent
Cherukara et al.

(10) Patent No.: US 11,765,274 B2
(45) Date of Patent: Sep. 19, 2023

(54) DETERMINATION AND DISPLAY OF ESTIMATED HOLD DURATIONS FOR CALLS

(71) Applicant: Google LLC, Mountain View, CA (US)

(72) Inventors: Joseph Joseph Cherukara, San Francisco, CA (US); Hong Chen, Mountain View, CA (US); Andrew George Shebanow, San Jose, CA (US); Rebecca Chiou, San Mateo, CA (US); Yixuan Geng, Mountain View, CA (US); Curtis Ray Robinson, Jr., Sunnyvale, CA (US); Yi Wang, Palo Alto, CA (US); Yue Gan, Sunnyvale, CA (US); Charlotte Hult, Denver, CO (US); Bin Sun, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/540,849

(22) Filed: Dec. 2, 2021

(65) Prior Publication Data
US 2023/0060694 A1    Mar. 2, 2023

Related U.S. Application Data

(60) Provisional application No. 63/236,648, filed on Aug. 24, 2021.

(51) Int. Cl.
*H04M 3/00* (2006.01)
*H04M 3/523* (2006.01)

(52) U.S. Cl.
CPC ............... *H04M 3/5238* (2013.01)

(58) Field of Classification Search
CPC .................................................. H04M 3/5238
(Continued)

(56) References Cited

U.S. PATENT DOCUMENTS 5,506,898 A     4/1996  Costantini et al.
5,696,809 A  *  12/1997  Voit .................... H04M 3/2254
                                                      379/267

(Continued)

OTHER PUBLICATIONS

Krasnoff, "Google's new 'Hold for Me' feature saves you from elevator music", The Verge; retrieved from Internet: https://www.theverge.com/2020/9/30/21496025/google-hold-for-me-assistant-phone-android-pixel, Sep. 30, 2020, 2 pages.

(Continued)

*Primary Examiner* — William J Deane, Jr.
(74) *Attorney, Agent, or Firm* — Shumaker & Sieffert, P.A.

(57) ABSTRACT

Implementations relate to determination and display of estimated hold durations for calls. In some implementations, a computer-implemented method includes obtaining an identifier of a target entity, the identifier usable by a first call device to initiate a call between the first call device and the target entity. A hold duration is determined that is an estimated amount of time before the call is matched to a human agent when the call is initiated at a particular time that is prospective to a current time. The hold duration is determined based on previous calls between one or more call devices and the target entity. The hold duration is provided for display by the first call device prior to the initiation of the call between the first call device and the target entity.

19 Claims, 8 Drawing Sheets

(58) Field of Classification Search
USPC ....... 379/265.01–265.14, 266.01–266.1, 309
See application file for complete search history.

(56) References Cited

U.S. PATENT DOCUMENTS

| | | | | |
|---|---|---|---|---|
| 6,597,779 | B1 * | 7/2003 | Wilk | H04M 3/428 |
| | | | | 379/162 |
| 6,728,363 | B2 | 4/2004 | Lieberman et al. | |
| 6,850,615 | B1 * | 2/2005 | Patel | H04M 3/51 |
| | | | | 379/265.09 |
| 7,065,203 | B1 * | 6/2006 | Huart | H04Q 3/0062 |
| | | | | 379/221.07 |
| 8,958,542 | B1 * | 2/2015 | Kaufman | H04M 3/5191 |
| | | | | 379/265.11 |
| 9,014,366 | B2 | 4/2015 | Nimmagadda | |
| RE46,776 | E * | 4/2018 | Petrovykh | H04M 3/5191 |
| 10,778,846 | B1 * | 9/2020 | Petropoulos | G06N 20/00 |
| 2003/0108187 | A1 | 6/2003 | Brown et al. | |
| 2005/0233733 | A1 * | 10/2005 | Roundtree | G06F 9/454 |
| | | | | 455/414.1 |
| 2007/0004384 | A1 * | 1/2007 | Anupam | H04M 3/4285 |
| | | | | 455/414.1 |
| 2007/0211879 | A1 | 9/2007 | Shaffer et al. | |
| 2007/0274495 | A1 | 11/2007 | Youd et al. | |
| 2009/0074166 | A1 | 3/2009 | Pavlic et al. | |
| 2012/0321070 | A1 | 12/2012 | Smith et al. | |
| 2013/0244632 | A1 * | 9/2013 | Spence | H04M 3/5183 |
| | | | | 455/415 |
| 2015/0036813 | A1 * | 2/2015 | Ananthakrishnan | |
| | | | | H04M 7/0027 |
| | | | | 379/265.09 |
| 2018/0234550 | A1 * | 8/2018 | Lifson | H04L 69/08 |

OTHER PUBLICATIONS

Perez, "A new Google Assistant feature, 'Hold for Me,' waits on hold so you don't have to", TechCrunch; retrieved from Internet: https://techcrunch.com/2020/09/30/a-new-google-assistant-feature-hold-for-me-waits-on-hold-so-you-dont-have-to/, Sep. 30, 2020, 4 pages.

International Search Report and Written Opinion of International Application No. PCT/US2022/037548 dated Nov. 10, 2022, 12 pp.

* cited by examiner

DETERMINATION AND DISPLAY OF ESTIMATED HOLD DURATIONS FOR CALLS

CROSS-REFERENCE TO RELATED APPLICATIONS

This application claims priority to U.S. Provisional Patent Application No. 63/236,648, entitled, "Determination and Display of Estimated Hold Durations for Calls," filed Aug. 24, 2021, which is incorporated herein by reference in its entirety.

BACKGROUND

People make many telephone calls to businesses or other entities to obtain information, schedule services, etc. A human agent for the entity typically speaks to the caller for particular requests or services that are not easily handled by automated responses. Many entities cannot handle the volume of calls received from callers for such information and services and therefore require some callers to wait in a holding queue until a human agent is available to take their calls. Some entities provide estimations of wait times for the human agent. Such estimations are determined by the entities based on, among other factors, a number of callers currently in a holding queue and availability of human agents.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to determination and display of estimated hold durations for calls. In some implementations, a computer-implemented method includes obtaining an identifier of a target entity, the identifier usable by a first call device to initiate a call between the first call device and the target entity. A hold duration is determined that is an estimated amount of time before the call is matched to a human agent when the call is initiated at a particular time that is prospective to a current time. The hold duration is determined based on a plurality of previous calls between one or more call devices and the target entity. The hold duration is provided for display by the first call device prior to the initiation of the call between the first call device and the target entity.

Various implementations and examples of the method are described. For example, in some implementations, obtaining the identifier, determining the hold duration, and providing the hold duration to be displayed are performed by a server device in communication with the first call device, obtaining the identifier includes receiving the identifier at the server device from the first call device that has received the identifier based on user input to the first call device, and providing the hold duration to be displayed includes sending the hold duration from the server device to the first call device to be displayed by the first call device. In some implementations, obtaining the identifier, determining the hold duration, and providing the hold duration to be displayed are performed by the first call device, and determining the hold duration includes accessing a data structure that stores hold durations or a machine learning model stored in local storage of the first call device that outputs hold durations in response to inputs including the target entity and the particular time. In some implementations, obtaining the identifier, determining the hold duration, and providing the hold duration to be displayed are performed by the first call device, and determining the hold duration includes requesting the hold duration from a server device over a communication network, sending the identifier from the first call device to a server device that determines the hold duration based on the identifier, and receiving the hold duration at the first call device from the server device prior to the initiation of the call between the first call device and the target entity, and requesting the hold duration is performed prior to obtaining a complete version of the identifier of the target entity.

In some implementations, determining the hold duration is based on use of a machine learning model or a data structure; the machine learning model receives inputs including the identifier and a time of the call and outputs a result indicating an estimated hold duration for the call, and is trained based on training data including identifiers, initiation times of the previous calls, call durations of the previous calls, and hold durations of the previous calls; and the data structure stores estimated hold durations for entities, the hold durations being based on the plurality of previous calls. In some implementations, the one or more call devices are a plurality of call devices associated with a plurality of users.

In some implementations, the hold duration is determined based on call duration data that indicates a plurality of call durations of the plurality of previous calls between the one or more call devices and the target entity, and hold duration data that indicates a plurality of hold durations of the previous calls. In some examples, the plurality of previous calls have call durations that are greater than a threshold duration and exclude calls that have call durations less than the threshold duration, and one or more of the hold durations are based on corresponding call durations of the call durations that are greater than the threshold duration. In further examples, the one or more hold durations are determined based on a function that estimates the one or more hold durations based on the call durations of the one or more previous calls, and the threshold duration and the function are customized for the target entity associated with the identifier.

In some implementations, the method further includes causing the particular time to be displayed by the first call device in association with display of the hold duration, the particular time being at least one day in advance of the current time.

In some implementations, the method further includes determining a plurality of hold durations for a plurality of prospective calls, the plurality of hold durations including the hold duration, wherein each of the plurality of hold durations indicates a respective estimated amount of time before an associated prospective call is matched to the human agent when the associated prospective call is initiated at a respective call time in advance of the current time, and wherein the respective call times are different from each other; and causing the plurality of hold durations to be displayed in association with their respective call times. In some implementations, the method further includes receiving user input that selects a prospective call having a particular hold duration of the plurality of hold durations and a particular call time associated with the particular hold duration, and scheduling the selected prospective call at the particular call time in a calendar associated with the first call device. In some examples, a notification is output by the first call device that indicates the particular call time is approaching or has arrived. In some examples, the call between the first call device and the target entity is automatically initiated by the first call device at the particular call time.

In some implementations, causing the hold duration to be displayed is performed during a first call between the first call device and the target entity, the call between the first call device and the target entity is a second call, and the first call is initiated prior to causing the initiation of the second call between the first call device and the target entity. In some implementations, the method further includes causing a prompt for user feedback to be displayed after termination of the call between the first call device and the target entity, receiving the user feedback indicating a degree of accuracy of the hold duration, and updating a data structure or a model used to determine the hold duration based on the user feedback.

In some implementations, a system to provide hold duration estimates for calls includes a memory storing instructions and at least one processor coupled to the memory, the at least one processor configured to access the instructions from the memory to perform operations. The operations include obtaining an identifier of a target entity, the identifier being usable by a first call device to initiate a call between the first call device and the target entity; determining a hold duration that is an estimated amount of time before the call is matched to a human agent when the call is initiated at a particular time that is prospective to a current time, the hold duration being determined based on a plurality of previous calls between one or more call devices and the target entity; and providing the hold duration to be displayed by the first call device prior to the initiation of the call between the first call device and the target entity.

In various implementations of the system, the operation of determining the hold duration is based on call duration data that indicates a plurality of call durations of the previous calls between the one or more call devices and the target entity, and hold duration data that indicates a plurality of hold durations of the previous calls. In some implementations, further operations include determining a plurality of hold durations including the hold duration, each of the hold durations indicating a respective estimated amount of time before the call is matched to the human agent when the call is initiated at a respective call time prospective to the current time, and the respective call times being different from each other; and causing the hold durations to be displayed in association with their respective call times. In various implementations, operations can include one or more features of the method above.

In some implementations, a non-transitory computer readable medium having stored thereon instructions that, when executed by a processor, cause the processor to perform operations. The operations include obtaining an identifier of a target entity, the identifier being usable by a first call device to initiate a call between the first call device and the target entity; determining a hold duration that is an estimated amount of time before the call is matched to a human agent when the call is initiated at a particular time that is prospective to a current time, the hold duration being determined based on a plurality of previous calls between a plurality of call devices and the target entity, and the plurality of call devices being associated with a plurality of users; and providing the hold duration to be displayed by the first call device prior to the initiation of the call between the first call device and the target entity. In various implementations, operations can include one or more features of the method or system above.

DETAILED DESCRIPTION

Figure 1:
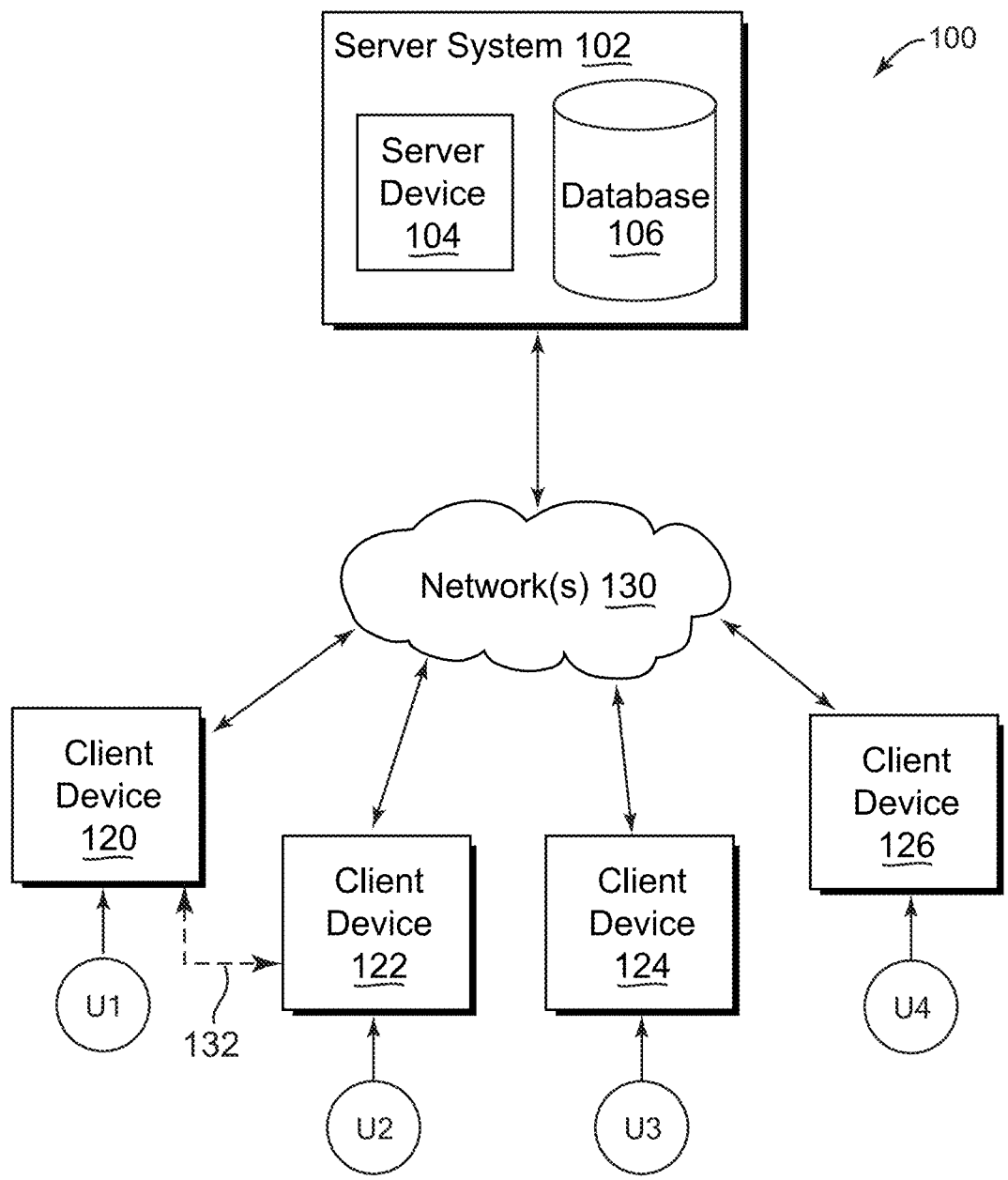
FIG. 1 is a block diagram of an example system which may be used for one or more implementations described herein.

One or more implementations described herein relate to determination and display of estimated hold durations for calls. In various implementations, a method includes obtaining an identifier of a target entity. The identifier can be used by a call device to initiate calls between the call device and the target entity; for example, a phone number or other identifier can be dialed to connect to a business and establish a call. One or more hold durations are determined that are estimated amounts of time before a call is matched to a human agent. The call for which hold durations are determined is a prospective call that is initiated at a call time after a current time and is not a call currently in progress. The hold durations are determined based on previous calls that, for example, were made by multiple users of call devices to the target entity. The determined hold durations can be displayed by the call device prior to the initiation of the prospective call between the call device and the target entity.

Various additional features are described. For example, in some implementations, determining the hold durations can be performed by a server in communication with the call device, where the server can send the hold durations to the call device to be displayed. In some implementations, obtaining the identifier and determining and displaying the hold durations can be performed by the call device. In various implementations, determining the hold durations can include accessing a data structure that stores hold durations. In some implementations, a machine learning model is used that outputs hold durations in response to input call characteristics of the prospective call, such as the target entity and the call time of the prospective call. In various implementations, the data structure and/or model can be stored on the server or in local storage of the call device. In some implementations, the client device can request the hold duration from a server or other remote device prior to obtaining a complete version of the identifier of the target entity.

In some implementations, the hold duration is determined based on call duration data that indicates call durations of the previous calls between the call devices and the target entity, and hold duration data that indicates hold durations of the previous calls. For example, the previous calls used to determine hold durations have call durations that are greater than a threshold duration and exclude calls that have call durations less than the threshold duration. One or more of the previous call hold durations can be based on corresponding call durations that are greater than the threshold. In some implementations, previous call hold durations are based on a function, where the threshold duration and the function can be customized for the target entity associated with the identifier.

In some implementations, multiple hold durations for prospective calls are determined at multiple respective call times that are different from each other, and the multiple hold durations can be displayed in association with their respective call times. In some implementations, user input can select a prospective call having a particular hold duration and prospective call time, and the selected prospective call is automatically scheduled at its call time in a calendar associated with the user. For example, a notification can be output by the call device that indicates the particular call time is approaching or has arrived, and/or the selected call is automatically initiated between the call device and the target entity at the particular call time.

There are several advantages to described techniques and features. Described implementations provide estimates of hold durations for a user for prospective calls that have not yet been initiated. This is unlike previous systems that provide estimated hold times for a call currently in progress, but do not provide a user with hold duration information for a call before that call is initiated. With estimates of hold durations for prospective calls, the user can plan and schedule calls more efficiently and with less potential frustration than if calling an entity without such information. Described techniques can provide estimated hold durations to a user for calls that are initiated now and/or initiated one or more hours or days in the future, allowing the user to plan calls at times and days that have the most convenience and time efficiency for their schedule and for their device usage. In addition, notifications can be provided to the user related to planned calls and the holding durations of those calls.

Furthermore, various implementations described herein determine estimated hold durations using call characteristics of previous calls made by users, without needing data received from the target entity (or an associated entity like a call center). For example, such data may indicate current or prospective agent availability, e.g., based on internal monitoring of agents and calls performed by the target entity or associated entity, and/or may indicate a number of callers currently in a holding queue waiting to speak to a human agent of the target entity. Techniques described herein need not use such agent availability and current holding queue data. For example, described techniques can estimate hold durations based on data related to previous calls by users and user devices, without needing to use current agent availability data, current holding queue data, or other data received from target entities or associated entities. This previous call data can include hold durations of previous calls that were determined automatically by devices, determined based on user feedback, and/or determined based on other call characteristics such as call durations of previous calls, thus providing a robust estimate of hold duration for calls at different upcoming days and times. Thus, described techniques can be used to estimate hold durations for any calls for which previous call data is available, e.g., calls that are made at times and/or to entities for which no current agent availability data or holding queue data is available or known.

A technical effect of one or more described implementations is that devices expend fewer computational resources to obtain results. For example, a technical effect of described techniques is a reduction in the consumption of system processing resources and power resources as compared to prior systems that do not provide one or more of the described techniques or features. For example, such a prior system may require a user to make multiple different calls to try to connect with a human agent at a target entity, each call requiring the user to hold for an amount of time that the user does not know in advance. The user often will terminate a call before being connected with the agent and try to call the target entity again at a different time in the hope that the holding duration will be smaller at that time. Such multiple attempts at calling expends system resources wastefully. Features described herein can reduce such disadvantages by, e.g., displaying hold durations for prospective calls that have not yet been initiated, allowing the user to make calls more efficiently and taking into account known hold durations at different call times, thus overall causing fewer calls to be initiated and lowering overall processing and power requirements of the call device, the target entity, and other devices that communicate with the call device to enable the calls.

Furthermore, in some implementations, a data structure and/or model can be used to determine hold durations and can be built and stored in advance of calls made by the user and in advance of determinations of hold durations. The pre-built data structure and/or model can be accessed efficiently by a call device via local storage or efficient communication with a remote device, such that the consumption of processing and networking resources during a call and in advance of a call are reduced. In contrast, some prior systems may require data indicating current agent availability at the target entity and/or the current number of callers in a holding queue to determine a current hold time estimate, which can require additional system processing and networking resources.

Further to the descriptions herein, a user may be provided with controls allowing the user to make an election as to both if and when systems, programs, or features described herein may enable collection of user information (e.g., information about a user's social network, social actions, or activities, profession, a user's preferences, a user's current location, a user's messages, outgoing calls placed by a user, or a user's device), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, which may be used in some implementations described herein. In some implementations, network environment 100 includes one or more server devices, e.g., server system 102 in the example of FIG. 1. Server system 102 can communicate over a network 130, for example. Server system 102 can include a server device 104 and a database 106 or other storage device. Network environment 100 also includes one or more client devices, e.g., client devices 120, 122, 124, and 126, which may communicate with server 102, with each other, and/or with other devices via network connections 130. Network 130 can be any type of communication network, including one or more of the Internet, local area networks (LAN), wireless networks, switch or hub connections, etc. In some implementations, network 130 can include peer-to-peer communication between devices 120-126, e.g., using peer-to-peer wireless protocols (e.g., Bluetooth®, Wi-Fi Direct, etc.) or having one client device act as a server to the other client device, etc. One example of peer-to-peer communications between two client devices 120 and 122 is shown by arrow 132.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems, e.g., via the network 130. In some implementations, server system 102 can include cloud hosting servers or servers providing call services (e.g., Voice over Internet Protocol, VOIP), for example. In some examples, database 106 and/or other storage devices can be provided in server system block(s) that are separate from server device 104 and can communicate with server device 104 and other server systems via network 130. Also, there may be any number of client devices. In some examples, server system 102 wirelessly communicates with client devices over network connections 130, the client devices providing various features that can be enabled or supplemented by signals from the server mobile device.

Server system 102 and client devices 120-126 can be any types of devices used in a variety of applications, e.g., desktop computer, laptop computer, portable or mobile device, cell phone, smart phone, tablet computer, television, TV set top box or entertainment device, wearable devices (e.g., display glasses or goggles, head-mounted display (HMD), earpiece, earbuds, fitness band, wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, client devices 120-126 may interact with server system 102 via applications running on respective client devices and/or server system 102. For example, respective client devices 120, 122, 124, and 126 may communicate data to and from server system 102. In some implementations, server system 102 may send various data to all or particular devices of the client devices, such as content data (e.g., audio, images, video, messages, emails, etc.), notifications, commands, etc. Each client device can send appropriate data to the server system 102, e.g., acknowledgments, requests for data, notifications, user commands, call requests, etc. In some examples, the server and client devices can communicate various forms of data, including text data, audio data, video data, image data, or other types of data.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface on a client device 120, 122, 124, and/or 126 can enable display of user content and other content, including images, video, data, and other content as well as communications (e.g., for phone or internet calls, videoconferencing, synchronous or asynchronous chat, etc.), privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Various applications and/or operating systems executing on the server and client devices can enable a variety of functions including communication applications (e.g., connecting and providing audio calls, videoconferences, chats, or other communications), email applications, display of content data, privacy settings, notifications, browsers, etc. A user interface can be displayed on a client device using an application or other software executing on the client device, software on the server device, and/or a combination of client software and server software executing on server 102, e.g., application software or client software in communication with server 102. The user interface can be displayed by a display device of a client device or server device, e.g., display screen(s), projector, etc. In some implementations, application programs running on a server can communicate with a client device to receive user input at the client device and to output data such as visual data, audio data, etc. at the client device. In some implementations, one or more devices of network environment 100, e.g., one or more servers of the server system 102, may maintain an electronic encyclopedia, a knowledge graph, one or more databases, a corpus of words, phrases, symbols, and other information, a social network application (e.g., a social graph, a social network for friends, a social network for business, etc.), a website for a place or location (e.g., a restaurant, a car dealership, etc.), a mapping application (e.g., a website that looks up map locations), call characteristics and data, etc. In some implementations, server system 102 may include classifiers of particular types of content items (e.g., text or images), and can determine whether any of particular classes are detected in received content items.

Some implementations can provide one or more features described herein on client or server devices disconnected from or intermittently connected to computer networks. In some implementations, a client device can provide features and results as described herein for asynchronous communications, e.g., via chat or other messages.

Machine learning models can be used by server system 102 and/or one or more client devices 120-126 as described herein. In some implementations, the machine learning models may be neural networks with one or more nodes, arranged according to a network architecture, e.g., in one or more layers, with various nodes connected via the network architecture, and with associated weights. For example, in a training stage of the model, a model can be trained using training data, and then at an inference stage, the trained model can determine output based on input data. In some implementations, a model may be trained offline, e.g., on a test device in a test lab or other setting, and the trained models may be provided to the server that executes the models. In some implementations, the trained model may be retrained or updated locally on-device, or an untrained model may be trained on-device. In some implementations, with user permission, federated learning may be utilized to update one or more trained models, e.g., where individual server devices may each perform local model training, and the updates to the models may be aggregated to update one or more central versions of the model.

Figure 2:
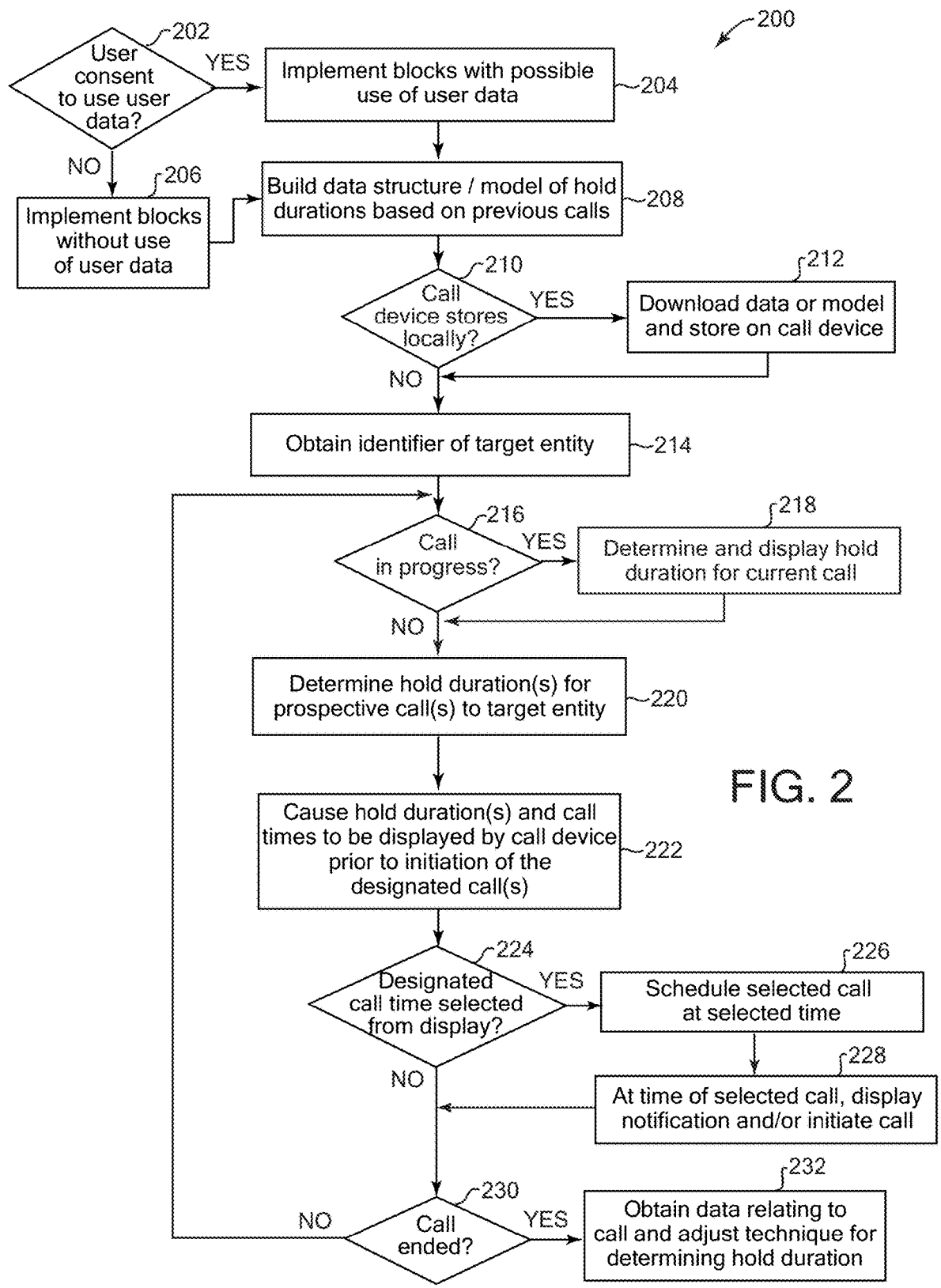
FIG. 2 is a flow diagram illustrating an example method to determine and display estimated hold durations for prospective calls, according to some implementations.

FIG. 2 is a flow diagram illustrating an example method 200 to determine and display estimated hold durations for prospective calls, according to some implementations. In some implementations, method 200 can be implemented on a server, e.g., server system 102 as shown in FIG. 1. In some implementations, some or all of the blocks of method 200 can be implemented on one or more client devices (e.g., client devices 120, 122, 124, and/or 126 as shown in FIG. 1), one or more server devices, and/or on both server device(s) and client device(s). In described examples, the system(s) implementing the blocks of method 200 include one or more processor hardware or processing circuitry ("processors"), and can access one or more storage devices such as database 106 or other accessible storage. In some implementations, different components of one or more server systems can perform different blocks or portions of blocks.

Some implementations can initiate method 200, or portions thereof, based on user input. A user may, for example, have selected the initiation of method 200 or particular blocks of method 200 from a displayed user interface. In some implementations, method 200 or portions thereof can be performed with guidance by the user via user input. In some implementations, the method 200, or portions of the method, can be initiated automatically by a device. For example, the method (or portions thereof) can be periodically initiated, or initiated based on the occurrence of one or more particular events or conditions. For example, such events or conditions can include obtaining data indicating one or more previous calls that have been performed by the device or other devices, a predetermined time period having expired since the last performance of method 200, and/or one or more other events or conditions occurring which can be specified in settings of a device implementing method 200. In some examples, a device (server or client) can perform the method 200 with access to call characteristics data (if user consent is received).

In block 202, it is checked whether user consent (e.g., user permission) has been obtained to use user data in the implementation of method 200. For example, user data can include user preferences, user call characteristics data, user-selected responses, other content in user interfaces of a device, or other content data items in a content collection (e.g., calls associated with a user), messages sent or received by a user, information about a user's social network and/or contacts, content ratings, a user's geographical location, historical user data, etc. One or more blocks of the methods described herein may use user data in some implementations.

If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, the remainder of method 200 is not performed, and/or particular blocks using the user data are not performed. In some implementations, if user consent has not been obtained, blocks of method 200 are to be implemented without use of user data and with generic or publicly-accessible and publicly-usable data.

In block 208, a data structure and/or model of hold durations is built based on data relating to previous calls of one or more users (e.g., phone calls, voice calls, or other calls placed via an over-the-top (OTT) service). Using the data structure or model, hold durations are estimated for various entities to which the previous calls have been made. As referred to herein, calls are made to various entities via identifiers associated with the entity, such as phone numbers or other address information (e.g., user names, email addresses, user identifiers, etc., token(s) mapped to a phone number or other address information, hash of a phone number or other address information, etc.) allowing voice communication. The entities can include any of various persons, organizations, businesses, groups, etc.

In some implementations, the estimated hold durations are determined using call characteristics of previous calls made by users and do not need data from the target entity (or an associated entity like a call center). Such data can include data that indicates current or prospective agent availability, e.g., based on internal monitoring of agents and calls performed by the target entity or associated entity, and/or data that indicates a number of callers currently in a holding queue waiting to speak to a human agent of the target entity. For example, the target entity (or associated entity) may track human agent availability at various times, and track the number of callers on hold, and may be able to provide estimates of hold durations based on this data. Techniques described herein need not use such data, e.g., techniques herein can use data related to previous calls that is based on use of user devices and without needing to use current agent availability data, current holding queue data, or other data received from the target entity or associated entity. Thus, described techniques can be used to estimate hold durations for any calls for which user call data is available, e.g., calls that are made at times and/or to entities for which no current agent availability data or holding queue data is available or known.

Block 208 can be performed as a preprocessing block that determines and stores data structure(s) and/or model(s) prior to initiating a call to a target entity and prior to determining and displaying hold durations for a current call and prospective calls as described below. In various implementations, the data structure or model can be in different forms. For example, in some implementations, the data structure is a table, graph, or other data structure that indicates estimated hold durations for particular identifiers (e.g., phone numbers or other address information) of various entities and for other call characteristics such as call time. These estimated hold durations are determined based on various call characteristics of previous calls made to the entities by one or more users. In some implementations, a model such as a machine learning model can be built, which can be trained based on data indicating call characteristics for previous calls to entities made by users. In an inference stage, the machine learning model can output an estimated hold duration based on inputs of one or more call characteristics.

Some examples of building data structures and models of hold durations are described below with reference to FIG. 3. The method continues to block 210.

In block 210, it is determined whether a call device is to store a data structure and/or a model (or portion thereof) in local storage of the call device. The call device is a device (e.g., a client device 120-126 of FIG. 1, or other device) that can be used to make calls to an entity. In some implementations, the call device can access a data structure or a model that has been stored in local storage of the call device (e.g., local memory or other local storage devices) to determine estimated hold durations for entities. In some implementations, a data structure such as a table or list can be stored locally, which stores hold durations that were previously determined for particular entities or entity identifiers. The call device can typically access such a data structure more quickly than accessing data stored on a remote device over a network.

In some implementations, a model such as a machine learning model, computational graph, or other model or data construct can be stored in local storage of the call device. The call device can access such a local model by providing input to the model and obtaining output from the model, without having to access a model (or request use and output of a model) provided by a remote device over a network connection. The call device can thus be prepared in block 212 with a data structure and/or model to determine hold durations at least partially locally to the call device.

If the call device is not to store a data structure and/or a model in local storage, the method continues to block 214, described below. For example, the call device may access the data or model on a remote device dynamically when required to determine estimated hold durations, as described with reference to FIG. 4.

If the call device is to store a data structure and/or a model (or portions thereof) in local storage, the method continues to block 212, in which data and/or one or more models are downloaded by the call device over a network from a remote device and stored in local storage of the call device. For example, a data structure (or portion thereof) of estimated hold durations for entities and/or entity identifiers can be obtained from a remote device such as a server, a different client device, or other device over a network. In some implementations, a subset of the entity names and/or entity identifiers available on the remote device, or a portion of a data structure, can be obtained for storage on the call device. For example, the most popular entity identifiers used to make calls by users (e.g., most frequently used, most frequently used within a particular time period, and/or most frequently used by users located in the same geographic location or region of the call device or having similar other characteristics to the user/call device) can be downloaded to the call device. In some implementations, a portion of a complete data structure can be downloaded to the call device, e.g., to accommodate more limited local storage on the call device. For example, a portion of the data structure can be downloaded that provides hold durations for entity identifiers that are located in the country of the user or a country in which the call device is currently located.

Additionally or alternatively, a model, or a portion of a model, can be downloaded over the network from a remote device to the local storage of the call device. Some examples of models (e.g., machine learning models) are described with reference to FIG. 3. In some implementations, a portion of an model can be downloaded to the call device, e.g., to accommodate more limited local storage on the call device. For example, a portion of a machine learning model structure can be downloaded that determines hold durations for entity identifiers that are in the country of the user or a country in which the call device is currently located.

In some implementations, the data structure and/or model can be received by the call device after such data structure and/or model is built in block 208, and can be periodically updated with new data and/or new model components based on particular conditions occurring, e.g., periodically after each particular time period, in response to the data or model being updated at the remote device (e.g., based on recent calls made by users, adding new entities or entity identifiers, etc.), etc. In some implementations, the data structure and/or model (or portion thereof) can be built on the call device and is not downloaded from a different device. The method may continue to block 214.

In block 214, an identifier of a target entity is obtained by the call device. The identifier can be, for example, a phone number or other call name, or other address information (e.g., user name, email addresses, user identifier, etc., token(s) mapped to a phone number or other address information, hash of a phone number or other address information, etc.). The entity identifier allows a call to be initiated to the target entity by the call device. The entity identifier can be obtained in any of several ways in various implementations and/or cases. For example, the entity identifier can be obtained via user input from a user of the call device. Such user input can include the user selecting keys of a physical or virtual keypad to input the identifier. In some examples, the entity identifier can be obtained in response to the user selecting a contact entry in a contact list stored on the call device, which causes an identifier associated with that contact entry to be automatically retrieved from storage and provided for use. For example, the identifier can be input or provided to an application running on the call device, such as a dialer application that initiates calls, or another application that can initiate calls. In some other examples, the entity identifier can be obtained from another application running on the call device, or from a remote device over a network.

In some examples, the entity identifier is received independently of a call, e.g., to view displayed hold durations for one or more upcoming calls to the target entity without initiating a call at the time the identifier is received. In other examples, the entity identifier is received to immediately initiate a call to the target entity at the current time, e.g., the identifier is received in a dialer application and a control to initiate the call is selected by the user or the call is automatically initiated by the call device. In some implementations, the entity identifier is received during a (current) call while or after a call to the target entity is being or has been initiated, e.g., the entity identifier is received by the call device to initiate a current call that may already be in progress, or to initiate a second call to a different target entity than a call already in progress. Some examples of obtaining an identifier of a target entity are described below with reference to FIG. 4.

In block 216, it is determined whether a call is in progress. For example, in some cases the call in progress may be a call that was initiated in response to receiving the identifier of the target entity in block 214, e.g., by a user selecting a contact or other control in an application and/or a call control to initiate a call. In some cases, the call in progress can be a designated call that was previously selected by the user and initiated at the designated call time in a previous iteration of method 200, e.g., via block 228. If there is no call in progress, the method continues to block 220, described below.

If there is a call in progress (e.g., a "current call"), the method continues to block 218, in which an estimated hold duration that pertains to the current call is determined and displayed on the call device. A hold duration is an estimated amount of time before a call is matched to a human agent during the call, e.g., before the human agent is available and can join the call to speak to the user during the call. In some implementations, the hold duration may be retrieved from a data structure, where the hold duration was previously determined based on call characteristics data. In some implementations, the hold duration may be determined using one or more models, e.g., machine learning models, as described herein with reference to blocks 210 and 212, and FIG. 3. The data structure and/or model may be stored in storage local to the call device or may be accessed remotely by the call device on a remote device over a network connection. Some examples of determining hold durations are described with reference to FIGS. 3 and 4. For example, a hold duration for a current call in block 218 can be determined similarly to the hold durations for one or more prospective calls in block 220, described below.

In some implementations, it can be determined whether the call device has been placed on hold in the current call by the target entity. For example, after a call has later been initiated and a call connection established between the call device and the target entity, and the user requests or selects to talk to a human agent during the call, the call device may be put on hold by the target entity, e.g., by an automated system of the target entity, due to no human agents being immediately available to talk to the user in the call. In some implementations, a hold duration can be determined and displayed in block 218 only if the current call is on hold. In some implementations, a hold duration can be determined and displayed in block 218 for the current call regardless of whether the current call is on hold. In some implementations, the user can designate to the call device that the call is on hold, e.g., by selecting a displayed control or option in a user interface of the call device. In some implementations, the call device can automatically detect whether the call is on hold without user input or intervention, e.g., by using speech recognition techniques to determine whether an automated system of the entity is indicating the call is on hold via particular words (e.g., "an agent can take your call in 10 minutes, thanks for waiting") or via music playing that indicates a hold status.

In block 220, one or more estimated hold durations are determined based on call characteristics data and/or the model, the hold durations being associated with one or more prospective calls by the call device to a target entity that are initiated at a later time than the current time. In some implementations, the prospective calls are calls that have not yet been initiated by the call device and do not include any call currently in progress by the call device. For example, one or more of the prospective calls can be initiated immediately after determining and displaying (as in block 222) the hold durations, or can be initiated at a call time further in the future, e.g., hours or days after displaying the hold durations.

A number of hold durations can be determined in block 220, each hold duration associated with a different prospective call that is initiated at a different prospective call time later than the current time. The hold duration(s) are determined based on call characteristics data and can be retrieved from a data structure in which they were stored after being previously determined, and/or can be determined based on one or more models, e.g., machine learning models. The data structure and/or models may be stored in storage local to the call device or may be accessed remotely by the call device on a remote device over a network connection. The hold durations for prospective calls can be determined, in various examples, prior to initiating any calls (e.g., prior to selection of a call control), during one or more current calls in progress, after a call is terminated, etc. Some examples of determining hold durations are described with reference to FIG. 4.

In block 222, the hold duration(s) determined in block 220 are caused to be displayed by the call device, e.g., prior to initiation of the prospective call(s) for which the hold duration(s) were determined. For example, the prospective times of the prospective calls and their associated estimated hold durations can be displayed within a user interface of the call device, such as an interface of a dialer application, or in a message or notification displayed on the call device. If a call has not yet been initiated on the call device, the prospective call times and hold durations can be displayed in an interface of the dialer application or other application (or as a notification by an operating system) so that the user can view the prospective hold durations prior to initiating a call. If a call is currently in progress on the call device when the hold durations are determined in block 220, the prospective call times and hold durations can be displayed in a separate window or display area, and/or in response to the user selecting a control to view the call times and hold durations during the call. In some implementations, a graphical representation of the hold durations can be displayed, e.g., as a bar graph, chart, or other representation. Some examples of displaying hold durations are described below with reference to FIGS. 5-10.

In block 224, it is determined whether one or more of the prospective call times displayed in block 218 has been selected by the user. In some implementations, displayed prospective call times that are associated with the displayed estimated hold durations in block 222 are selectable by a user, e.g., via a touchscreen interface, voice command, or other user input. If none of the prospective call times is selected in block 224 (or they are not selectable, in some implementations), the method continues to block 230, described below. If one or more of these call times are selected, the method continues to block 226, in which a prospective call that is associated with each selected call time is scheduled at that time. In some implementations, the scheduling can include scheduling the selected call time in an application, e.g., a dialer application or other application that can provide notifications. In some implementations, the scheduling can include adding an entry into the user's calendar at the time of the prospective call in a calendar application executing on the call device. For example, the user can open the calendar application or other application to view an entry that shows the target entity and the scheduled call time to call the target entity. An option to reschedule the scheduled prospective call can also be provided (e.g., via displayed controls in the user interface) in some implementations.

If the user initiates or is present in a call with the target entity, in some implementations the call device can automatically detect whether the user is on hold at a point during the call. For example, this can be detected based on detection of speech data received by the call device from the target entity, programmatically analyzing the speech data. In some implementations, the call device can detect whether a human agent has connected to the call while the call is on hold, e.g., via particular words spoken by the agent or user, cessation of hold music or an automated voice, etc., such that the call is no longer on hold. In some implementations, the call device can output a notification that indicates that the call is no longer on hold and the human agent is connected to the call, e.g., if the user has requested such a notification. In some implementations, the hold duration of the call can be stored and used to update a data structure or model, as described below. The method may continue to block 228.

In block 228, at (or approaching) the call time of the prospective call that was scheduled in block 226, a notification is displayed and/or the call is initiated automatically by the call device. For example, at a predetermined amount of time before the prospective call time (e.g., 5 or 10 minutes before), a notification is displayed that reminds the user that the time for the prospective call is about to arrive. In some implementations, the notification can include the estimated hold duration for this call (the hold duration can be updated if the data structure or model has been updated with additional call characteristic data since the original estimated hold duration was determined). In some implementations, the user can then initiate the scheduled call manually, e.g., via a dialer application, contact list, etc. In some implementations, e.g., if the user has input a preference to do so, the scheduled call can be initiated automatically by the call device at the call time. For example, a dialer or call application on the call device can automatically dial the entity identifier without user input or intervention and can notify the user of the call that is being initiated. The method may continue to block 230.

In block 230, it is determined whether a call of the call device has ended. For example, in some cases the call can be a current call in progress that was detected in block 216. In some cases, the call may have been initiated after the display of prospective hold durations in block 222. In some cases, the call can be a prospective call initiated at or after block 228. If a call has not ended, the method may continue to block 216 to determine if the call is in progress, and/or the call device can wait for additional user input.

If a call has ended in block 230, the method continues to block 232, in which call characteristics data relating to the call is obtained and, if appropriate, one or more techniques for determining the hold durations of calls is updated based on the data. For example, with user permission, the call characteristics data can include characteristics such as the identifier of the target entity for the call, the duration of the call, the hold duration during the call if the user was put on hold in the call, the time of the call (including day of the week, day of the month, etc.), whether the call was made on a holiday, and/or any other call device context information. This call characteristics data can be used to update a data structure, and/or can be provided to update a model, used to determine hold durations as described herein, if permitted by the user. For example, if the data structure includes an average call duration and/or average hold duration for the target entity, those averages can be adjusted based on data including the call duration and hold duration from the ended call. A model can be further trained and updated with data from the ended call and additional user calls.

In some implementations, feedback can be requested from the user during or after a call. For example, the call log of the call device can include an option or control associated with the ended call in the log, where the user can select the control to input feedback regarding the ended call. For example, the user can be requested to input the holding duration that the user was on hold during the ended call, if such holding duration has not been automatically determined. In some implementations, the call device can present an estimate of the holding duration as determined automatically by the call device (e.g., based on speech recognition techniques as described herein) and request that the user confirm the estimate, or adjust the estimate if it is incorrect. In this manner, more accurate hold durations can be determined for previous calls, thus enabling improvements in accuracy in determining holding duration estimates in advance of new calls.

Figure 3:
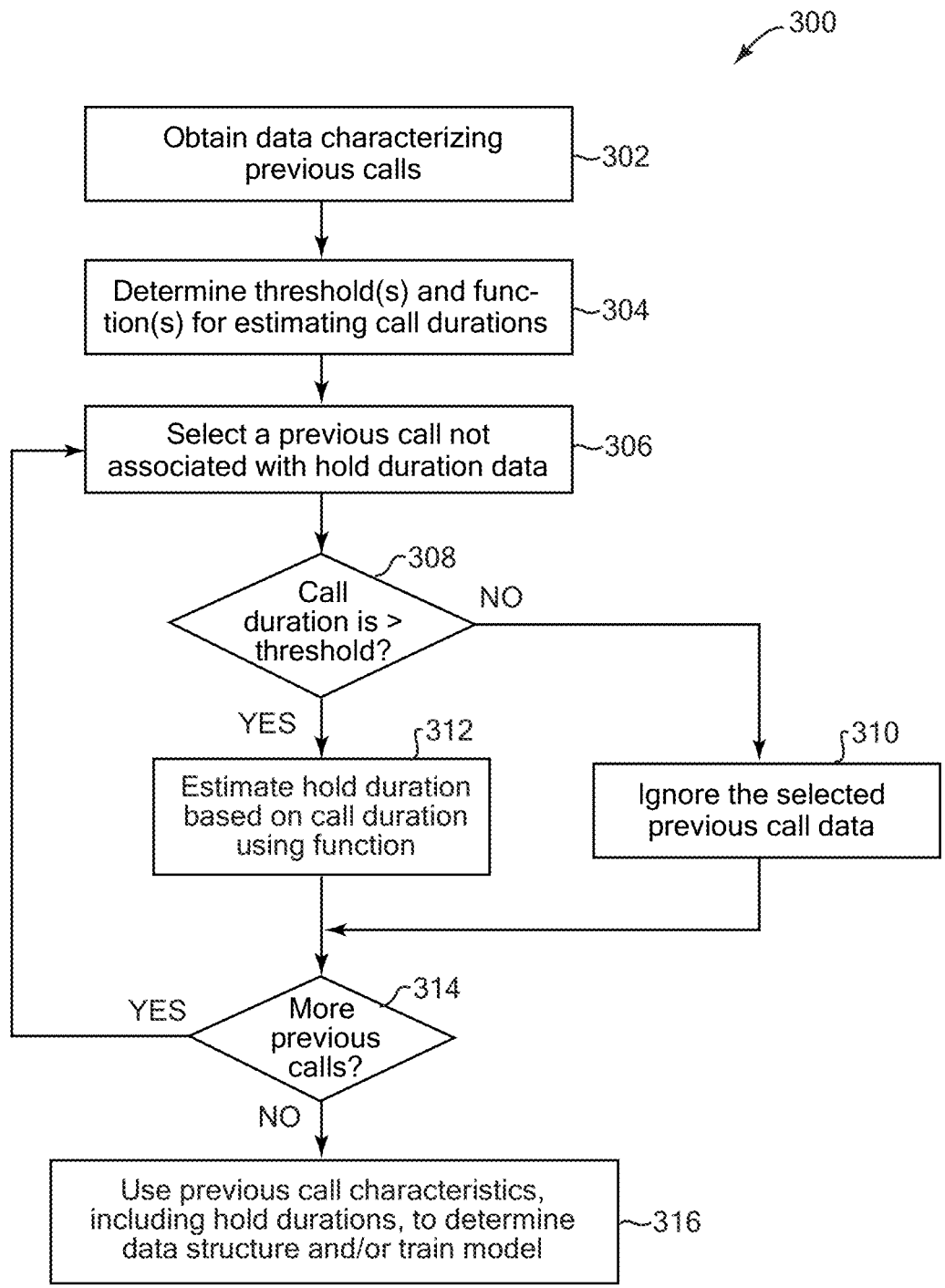
FIG. 3 is a flow diagram illustrating an example method to build a data structure and/or model used for estimating hold durations for prospective calls based on previous calls, according to some implementations, according to some implementations.

FIG. 3 is a flow diagram illustrating an example method 300 to build a data structure and/or model used for estimating hold durations for prospective calls based on previous calls, according to some implementations. For example, method 300 can be implemented as block 208 or a portion of block 208 of FIG. 2 to determine hold durations based on previous calls of users. In some implementations, method 300 can be performed by a server or other device besides a call device, e.g., to build the data structure and/or model that can be downloaded or accessed by a call device (e.g., client device or other device) to determine hold durations for prospective and/or current calls as described with reference to FIG. 2. In some implementations, method 300 can be performed by a call device, e.g., a client device, or different portions of method can be performed by a server device and a client device, respectively.

The method begins at block 302. In block 302, data that characterizes previous calls (stored and made available for the purposes of determination of hold durations, model training, etc. with specific user permission from prior callers) is obtained. For example, the data can include call characteristics of calls between one or more users to various entities, where the call characteristics have been disassociated from the users that made the calls so that only the call characteristics are known. For example, the previous calls may have been made by a population of users using call devices from which the call characteristics are obtained, with user consent, over a communication network. The call characteristics can include, for example, the entity identifiers of entities that were called (e.g., phone numbers, call addresses, or other identifiers used to connect to the target entity via the previous calls), the durations of the calls (the time from the initiation or connection of the call to the termination or disconnection of the call), the times of the calls (e.g., hour and/or minute of day, day of week, date of the year), whether each call was made during (and/or just prior to) an event such as a holiday, the opening day of a business event, etc., whether each call was made on a weekday or weekend, etc.

In some implementations, the obtained call characteristics can include hold durations that occurred in previous calls, e.g., durations of time periods when the user was put on hold during the previous calls. For example, one or more previous call hold durations may be determined, if user consent has been obtained, automatically by the call device (and/or by a connected remote device) based on analysis of speech data in audio data recorded from the previous calls using techniques such as speech recognition via machine learning models or other techniques. For example, speech recognition techniques can recognize when a call is put on hold by examining the call audio for particular words and/or other techniques can examine the call audio for other audio (e.g., words spoken by an automated call responder that indicate that the user is on hold, music playing that indicates the call is on hold, etc.). Such techniques can also be used to recognize when the user is no longer on hold, e.g., hold music in the audio data stops and a (different) voice from the target entity is detected in the call that is answered by the user to indicate a human agent has connected to the call, as well as words spoken from the target entity that indicate a human agent (e.g., "hello", etc.), and so on. After a system has determined the initiation of an on-hold period in which the caller was put on hold and the cessation of that on-hold period, the hold duration between these points in time can be determined for the previous call.

Furthermore, in some implementations, one or more hold durations of previous calls can be determined based on user feedback, e.g., during a call or after calls have ended (e.g., similar to block 232 of FIG. 2). For example, users can input estimated hold durations to call devices after the call has ended.

In some implementations, one or more of the previous calls may not be associated with hold durations that have been determined by detection in call audio or by user feedback as described above. In some implementations, hold durations can be estimated for previous calls that do not have such hold durations, as described below for blocks 306-314. The method may continue to block 304.

In block 304, threshold(s) and function(s) are determined for estimating call durations of the previous calls that do not have hold durations already specified. These thresholds and functions can be used as described below to estimate hold durations for at least some of the previous calls for which data was obtained in block 302. For example, hold duration can often be generally correlated with call duration of calls, if the call duration of the calls is above a particular threshold. Call durations below the threshold may not be indicative of hold duration, e.g., due to the various varying circumstances and user behavior in short call durations; for example, users may be more willing to disconnect the call instead of waiting on hold. A threshold call duration can be used to determine which of the previous calls are to be used in determining estimated hold durations. In some implementations, the functions determined in block 304 can include a function that converts a call duration to an estimated hold duration. For example, call durations (above the threshold) of the previous calls as well as any hold durations known of the previous calls can be analyzed to determine a relationship between call duration and hold duration. A function can be determined that converts call duration to hold duration.

In some implementations, a single threshold and a single function can be determined for general application to all previous calls. In some implementations, multiple thresholds and/or functions can be determined, each threshold and/or function being modified, customized, or specialized for calls having particular call characteristics, such as calls having particular target entities, the call times of previous calls, etc. For example, based on call durations and hold durations of previous calls (for which such call characteristics are known) to a particular entity, it may be evident that call durations above a particular threshold duration are better correlated to hold durations for calls to that particular entity, and that particular threshold is greater than a general threshold determined from previous calls to other entities. Thus, the threshold call duration for that particular entity can be set to a higher value than the general threshold call duration. Similarly, via call characteristics of the previous calls to a particular entity, it may be evident that the relationship between call duration and hold duration may be different for the particular entity than the relationship determined for a general function based on previous calls to other entities. Thus, a function that is specific to that relationship can be determined and associated with calls to that particular entity. For example, in some implementations, one or more such modified thresholds can be retrieved from a data structure that stores such thresholds associated with particular target entities and/or other call characteristics. The method may continue to block 306.

In block 306, a previous call is selected from the set of previous calls obtained in block 302. The selected previous call does not have associated hold duration data. The method continues to block 308.

In block 308, it is determined whether the call duration of the selected previous call is greater than the threshold call duration. For example, the threshold call duration can be a call duration over which a call will more likely have a hold duration correlated with the call duration. For calls having a call duration under the threshold call duration, hold duration is not as well correlated to call duration. In some implementations, as described above, the threshold call duration is a general call duration used for all previous calls obtained in block 302, e.g., regardless of the target entity of the selected previous call. In some implementations, the threshold call duration can be a modified threshold that is, e.g., customized to the target entity and/or other call characteristics of the selected previous call, as described above for block 304.

If the call duration is greater than or equal to the threshold call duration, the method continues to block 312, described below. If the call duration is less than the threshold call duration, the method continues to block 310, in which the selected previous call is ignored for the purposes of method 300, e.g., its call characteristics are ignored for determining an estimated hold duration for the target entity and ignored for training a model that provides estimated hold durations. The method may continue to block 314, described below.

In block 312, the call duration of the selected previous call has been found to be greater than the threshold and thus its call characteristics can be used to determine a hold duration. In some implementations, a hold duration is estimated for the selected previous call based on the corresponding call duration of the previous call, using a hold duration function. The function can determine a conversion of the call duration to an estimated hold duration for the selected previous call based on a relationship of call duration to hold duration. The hold duration function is applied to previous calls that have a call duration above the threshold used in block 308, since such previous calls have been found to have a call duration that is highly correlated to hold duration. In some implementations, the function can be updated over time based on additional previous call data that is obtained from user calls. In some examples, the relationship between the call duration and the hold duration is a linear regression, and the hold duration function implements this linear regression via multiplication by a first factor and/or addition of a second factor to the call duration to obtain the estimated hold duration. For example, an (initial) function can be (call duration*0.66−5.22) to obtain an estimated hold duration.

In some implementations, the hold duration function can be a modified and customized function that, e.g., is customized to the target entity of the selected previous call or to other call characteristics, as described above for block 304. For example, such a modified function can be retrieved from a data structure that stores such functions associated with particular target entities and/or other call characteristics. The method may continue to block 314.

In block 314, it is determined whether there are more previous calls in the set of calls obtained in block 302 that are not yet associated with a hold duration and that have not yet been processed in method 300. If so, the method continues to block 306 to select another previous call to process. If there no more previous calls to process as determined in block 314, the method continues to block 316, described below.

In some implementations, estimations of hold durations for previous calls can be determined using multiple techniques and the results of these techniques can be compared to determine differences, if any, between the results. The comparison can indicate possible errors in one of the techniques, e.g., if results are drastically different, the hold duration can be recalculated or ignored.

In block 316, a data structure and/or train a model is determined using the call characteristics of the previous calls, where the call characteristics include hold durations of the previous calls. The hold durations used to determine the data structure and/or train the model can include hold durations previously determined for previous calls (e.g., via automatic hold detection and/or user feedback), as well as estimated hold durations determined in block 312. The determined data structure and/or trained model can be used to determine hold durations for new calls, e.g., current and prospective calls.

In some implementations, a data structure can be determined, which can include a table, list, or other structure that stores data including each target entity and a respective estimated hold duration for that target entity. For example, one or more of the estimated hold durations can be looked up in the data structure via the target entity and provided as estimated hold durations for prospective (or current) calls to the target entity as described for FIG. 2. In some implementations, the estimated hold duration stored in the table can be determined as an average of all the previous hold durations for the target entity known or estimated from previous calls. In some implementations, the estimated hold duration can alternatively be a different combination of the previous hold durations, e.g., mean, median, etc. In some implementations, the data structure can also include various other call characteristics that can be looked up in the data structure to determine a hold duration for a prospective call, such as time of the call, day of the week of the call, whether the call is initiated on a holiday or during another event, etc. A hold duration for a particular call time can be based on the hold durations of previous calls initiated at that call time (e.g., within a threshold time period of that call time). For example, for each entity stored in the data structure, a number of these call characteristics can be listed (e.g., different times of day, day of week, etc.), and a hold duration can be associated with each call characteristic or with one or more different combinations of the call characteristics. In some examples, to determine a hold duration for a prospective call having a particular call time, the call time (and/or day) is looked up in the data structure to determine the estimated hold duration for that call.

In some implementations, hold durations for particular prospective calls can be determined based on call characteristics of only some of the available previous calls, e.g., subsets of the entire set of available previous calls. For example, hold durations for particular call characteristics (such as a particular call time or target entity) may be known to fall outside a standard estimation. For example, a particular call time that is on a day having non-standard user call behavior (e.g., on a holiday or a day before a holiday) can be determined based on call characteristics of more recent previous calls, such as calls within a threshold time period of the call time of the hold duration being determined. For example, the used previous calls may have been initiated or occurred within the last hour to the particular call time.

In some implementations, one or more models can be trained based on the call characteristics of the previous calls or a subset thereof. For example, in some implementations, the model is a machine learning model, e.g., a neural network with one or more nodes, arranged according to a network architecture, e.g., in one or more layers, with various nodes connected via the network architecture, and with associated weights. For example, in a training stage of the model, a model can be trained using training data, and then at an inference stage (e.g., as described in FIG. 2), the trained model can provide output based on input data. In some implementations, a model may be trained offline, e.g., on a test device in a test lab or other setting, and the trained models may be provided to a server or call device that executes the models. In some implementations, with user permission, federated learning may be utilized to update one or more trained models, e.g., where individual devices may each perform local model training, and the updates to the models may be aggregated to update one or more central versions of the model. Additional examples of features that can be included in the model are described below with respect to FIG. 11.

The training data for a machine learning model can include user-permitted call characteristics of previous calls as described above, e.g., the identifiers of entities that were called, the call durations, the call times (e.g., hour and/or minute of day, day of week, etc.), whether each call was made on a weekday or weekend, whether each call was made during an event (such as a holiday, the opening day of a business event, etc.). In some implementations, the model is trained by the training data to provide holding durations for any call time or target entity for which previous calls have been obtained as training data, including hold durations for calls at particular call times or having other particular call characteristics. For example, the model can be trained to output a longer estimated holding duration if the inputs indicate a prospective call time that occurs on a day before a holiday when call volumes from users may be higher than on most other days.

Figure 4:
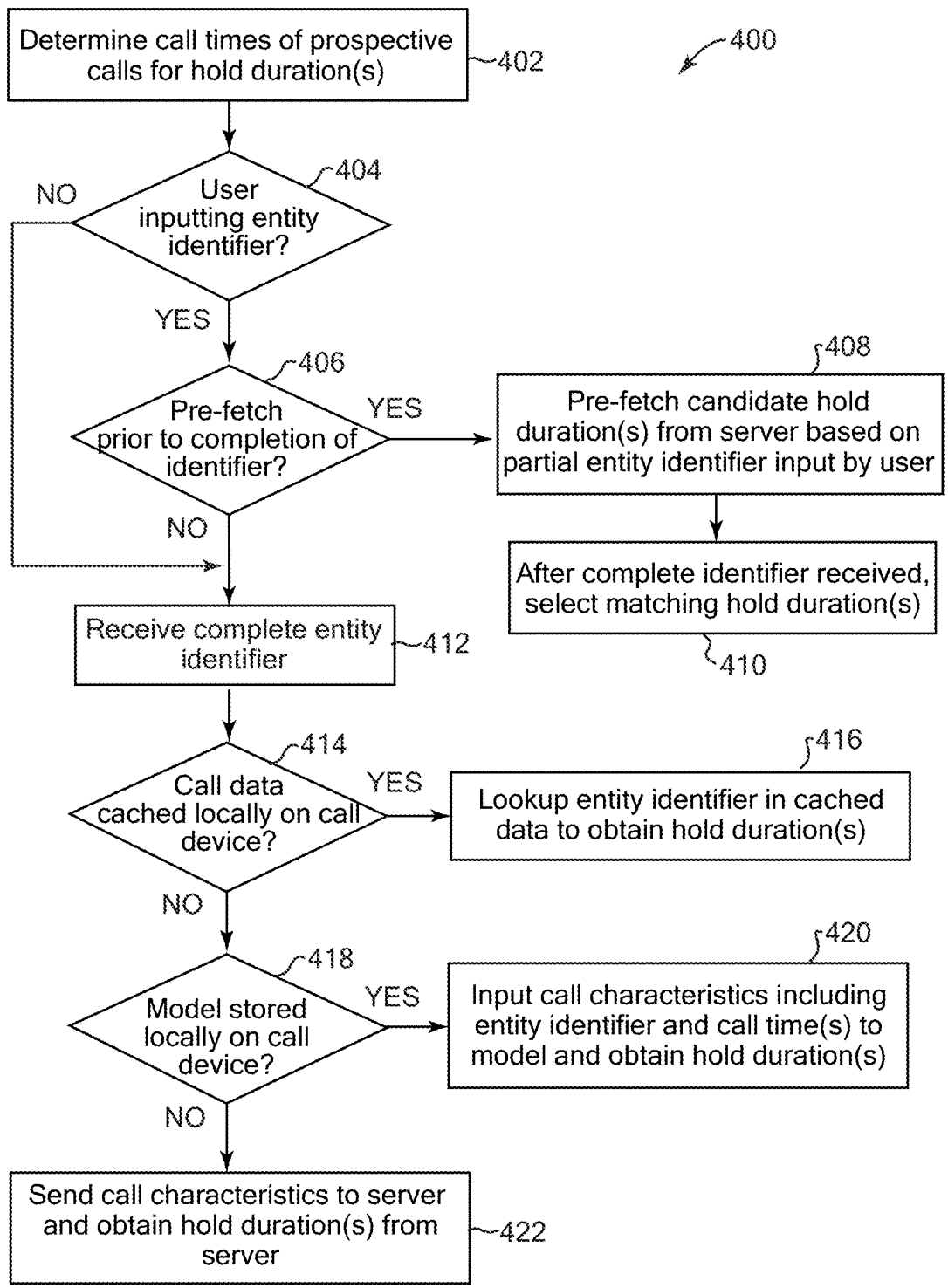
FIG. 4 is a flow diagram illustrating an example method to determine hold durations for prospective calls to a target entity, according to some implementations.

FIG. 4 is a flow diagram illustrating an example method 400 to determine hold durations for prospective calls to a target entity, according to some implementations. For example, method 400 can be implemented in block 214 of FIG. 2 in which an identifier is being obtained by the call device and/or in block 220 of FIG. 2 in which hold durations are determined for prospective calls to the target entity.

The method begins at block 402. In block 402, the call times of prospective calls are determined for which estimated hold durations are to be determined. This can include determining the particular call times and/or the number (amount) of prospective calls for which hold durations are to be determined. Each hold duration to be determined can be associated with a different prospective call that is initiated at a different prospective call time. The call times of prospective calls can be based on any of a number of factors. For example, user settings or preferences may have been provided by the user (e.g., designated on the call device, such as in a dialer application or other application) to indicate how many different prospective calls or hold durations and/or the call times of those prospective calls. Such preferences can indicate, for example, whether hold durations are to be provided for prospective calls having call times on different prospective days, all on one day (e.g., a current day), at particular periods or hours of each day, particular days of the week, etc. In some implementations, the number and call times of prospective calls can be based on other conditions, e.g., data in a calendar of a user (e.g., indicating which hours and/or days that the user is available to make a call), the known business hours of the target entity, etc.

In various examples, the determined call times for the prospective calls can be at various times. For example, the determined call times can span the business hours of the target entity over a standard weekday and/or weekend day. In further examples, the determined call times can be spaced regularly over the span of a day, e.g., every hour, every half hour, etc. In some implementations, the determined call times span the remaining business hours of the target entity for the current day (e.g., if the current time is near the end of the target's entity's business hours, then the prospective calls can include calls in those remaining business hours and calls on the next day or following days). In some implementations, if user consent has been obtained, the determined call times can be particular times on each day, based on a history of (e.g., characteristics of) previous calls to the target entity that the user has made. For example, if the user has previously only made calls to the target entity between the hours of 9 am and 11 am, then call times within that time period can be determined for prospective calls (and, e.g., other call times are not determined or are determined later if the user inputs a request for other call times). In further examples, prospective call times can be determined based on a frequency of previous calls at particular times or in particular time periods. For example, if a number of calls that the user made in a particular time period (e.g., on different days) is over a threshold number, then prospective call times within that time period can be determined. In another example, previous calls to the target entity having at least a minimum or threshold call duration are eligible to be counted in the determination of call times, e.g., in the above examples and implementations, and/or previous calls under the threshold duration can be ignored for such call time determination.

In some implementations, determined call times within a previously-called time period described above, and/or which have other characteristics, can be designated to have a higher priority than other determined call times (a particular number of lower priority call times can also be determined and provided as additional options for the user, in some implementations). For example, hold durations associated with higher priority call times can be part of the initial or default display of hold durations, while lower priority hold durations can be hidden by default and displayed if commanded by user input received from the user. In further examples, hold durations associated with higher priority call times can be displayed and other or lower priority hold durations not displayed when a display area has limited area in which to display information. In some implementations, call times and hold durations can be ranked based on one or more factors described above (e.g., based on characteristics of previous calls in a user history of call times to the target entity), such that the top X highest ranking call times/hold durations of a set of determined call times are displayed, where X can be 5, 10, etc. and lower ranking call times and hold durations can be not displayed. The method continues to block 404.

In block 404, it is determined whether the user is currently inputting an entity identifier of the target entity to the call device, e.g., in order to initiate a call to the target entity. For example, the entity identifier may be in process of being obtained in block 214 of FIG. 2, and the user has not yet completed the entry of the entity identifier. If the user is not currently inputting an entity identifier, the method continues to block 412, described below.

If the user is current inputting an entity identifier, then the method continues to block 406, in which it is determined whether to pre-fetch candidate hold durations for the target entity prior to the completion of the input or obtaining of the entity identifier. For example, in some implementations, the portion of the entity identifier that has been received can be considered a prefix that could be part of any of multiple candidate entity identifiers when completed. Candidate hold durations associated with such candidate identifiers can be pre-fetched from a remote device and stored in local storage of the call device before the complete identifier is obtained by the call device. The pre-fetching allows hold durations for the completed identifier to be displayed by the call device quickly after the identifier is complete, since the hold durations are selected from the set candidate hold durations that are locally stored. For example, such pre-fetching may be desirable in some implementations in which the call device obtains hold durations for prospective calls from a remote device such as a server or other device, e.g., where a data structure or model for determining hold durations is not stored in local storage of the call device. In implementations in which hold durations can be determined via a data structure or model stored in local storage of the call device, determining of hold durations may be quick enough that pre-fetching of candidate hold durations prior to completion of the entity identifier is not needed.

In some implementations, pre-fetching of candidate hold durations is performed if a threshold portion of the complete identifier has been received. In some examples, if complete entity identifiers are 10 digits, then the pre-fetching can be performed after, and not before, the 8th (or, alternatively, 9th) digit of the partial identifier has been received. This allows the number of candidates to be narrowed to an amount of data that can be received at the call device in a relatively short time sufficient to determine the matching hold duration after the complete identifier is received (as described below).

If pre-fetching of candidate hold durations is not to be performed, the method continues to block 412, described below. If pre-fetching of candidate hold durations is to be performed, the method continues to block 408, in which candidate hold durations are pre-fetched from a remote device such as a server based on the partial entity identifier that has been input by the user. For example, the call device can send a request to the remote device and receive the candidate hold durations for candidate entity identifiers that match the partial identifier that has been received in block 404. The remote device can determine the hold durations using, for example, a data structure and/or model(s) similarly as described above in FIG. 3, and sends the hold durations to the call device over the network.

In some implementations, a subset of a larger amount of candidate hold durations is determined, e.g., by the call device or the remote device, to be pre-fetched by the call device. For example, the subset of candidate hold durations can be associated with entity identifiers that are the most likely identifiers to be input by the user, as determined based on one or more factors. For example, the most likely identifiers can be based on history data indicating which entities that the user has previously called, e.g., where the identifiers of the most frequent and/or the most recent entities previously called by the user are considered the most likely to be the received identifier. In some implementations, current or recent conversations or messages of the user can be examined to determine if any entities have been mentioned (and/or determine whether subjects related to particular entities have been mentioned, such as a service or product offered by the entities), so that the identifier(s) of those mentioned entities are selected to be in the subset as likely candidate identifiers to match the received identifier. The hold durations associated with these likely identifiers are selected to be among the most likely hold durations to be displayed to the user and thus are pre-fetched to the call device. The method continues to block 410.

In block 410, the complete entity identifier has been received (e.g., the user has finished inputting the identifier of the target entity to the call device) and hold duration(s) that match the complete identifier are selected from the candidate hold durations. For example, the candidate hold durations that do not match the complete identifier can be discarded. In some examples, if the user has entered the first 9 digits of a phone number in block 404, candidate hold durations for entity identifiers that match those 9 digits can be fetched to the call device in block 408, and in block 410 the final and 10th digit has been received and the hold durations associated with that entity identifier are selected. The method may continue to block 222 of FIG. 2 to display the selected hold durations as described above.

In block 412, the (complete) entity identifier is received. For example, the user may have finished manually inputting an entity identifier of the target entity, or the entity identifier may have received from a different source such as an application running on the call device (e.g., a contact entry in the contacts of the user has been selected by the user, a displayed phone number or other call identifier is selected by the user in an application, etc.). The method may continue to block 414.

In block 414, it is determined whether call characteristics data is cached in local storage of the call device. For example, the call characteristics data can be provided in one or more data structures that store entity identifiers and hold duration(s) that have been estimated for those identifiers, examples of which are described with reference to block 316 of FIG. 3. If call data is not cached locally on the call device, the method continues to block 418, described below. If call data is cached locally on the call device, the method continues to block 416, in which the entity identifier of the target entity and prospective call time(s) are looked up in the data structure (cached call characteristics data) to determine hold duration(s) for the prospective calls determined in block 402. The method may continue to block 222 of FIG. 2 to display the determined hold durations as described above.

In block 418, it is determined whether a model for determining hold durations is stored in local storage of the call device. For example, the model can be a machine learning model that has been trained to output estimated hold durations based on inputs such as call characteristics, e.g., the target entity, a call time, etc., examples of which are described with reference to block 316 of FIG. 3. If a model is not stored locally on the call device, the method continues to block 422, described below. If a model is stored locally on the call device, the method continues to block 420, in which call characteristics of the prospective calls, such as the entity identifier of the target entity, the prospective call time(s), and/or other call characteristics, are input to the model, and the outputs of the model are obtained including hold duration(s) for the prospective calls determined in block 402. The method may continue to block 222 of FIG. 2 to display the determined hold durations as described above.

In block 422, one or more call characteristics of the prospective calls determined in block 402 are sent to a remote device such as a server and the hold durations for those calls are obtained from the remote device. For example, the call device can send the identifier of the target entity and the prospective call times determined in block 402 to the remote device, as well as other information that can be used to determine hold durations (e.g., whether the call times occur on a holiday, etc.). The remote device can determine the hold durations using, for example, a data structure and/or model(s) similarly as described above in FIG. 3, and sends the determined hold durations to the call device over the network. The method may continue to block 222 of FIG. 2 to display the determined hold durations as described above.

In some implementations, a trained model such as used in block 420 or block 422 can be additionally trained or updated with additional data, e.g., as described above with reference to block 232 of FIG. 2. The model can be trained locally on the call device, or a model on a remote device can be trained based on data received from the call device.

In various implementations, one or more of the blocks can be omitted from method 400, e.g., if particular features of those blocks are not provided in particular implementations. For example, in some implementations in which a model is used locally by the device to determine hold durations and the other described techniques to determine hold durations are not used, the blocks 404-418 and 422 can be omitted. Similarly, in some implementations in which a model is not used, blocks 418 and 420 can be omitted.

The methods, blocks, and operations described herein can be performed in a different order than shown or described in FIGS. 2-4, and/or performed simultaneously (partially or completely) with other blocks or operations, where appropriate. For example, blocks 216 and 218 of FIG. 2 can be performed before, after, or at least partially simultaneously with blocks 220-226. Block 230 of FIG. 2 can be performed at any of various times in method 200. In other examples, blocks 402, 412 and 416 can be performed at least partially simultaneously or in a different order than shown in the example of FIG. 4. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

One or more methods disclosed herein can operate in several environments and platforms, e.g., as a stand-alone computer program that can run on any type of computing device, as a mobile application ("app") run on a mobile computing device, etc.

One or more methods described herein (e.g., 200, 300, and/or 400) can be run in a standalone program that can be executed on any type of computing device, a program run on a web browser, a mobile application ("app") run on a mobile computing device (e.g., cell phone, smart phone, tablet computer, wearable device such as wristwatch, armband, jewelry, headwear, virtual reality goggles or glasses, augmented reality goggles or glasses, head mounted display, etc., laptop computer, etc.). In one example, a client/server architecture can be used, e.g., a mobile computing device (as a client device) sends user input data to a server device and receives from the server the final output data for output (e.g., for display). In another example, all computations of a method can be performed within the mobile app (and/or other apps) on the mobile computing device. In another example, computations can be split between the mobile computing device and one or more server devices.

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Figures 5, 6:
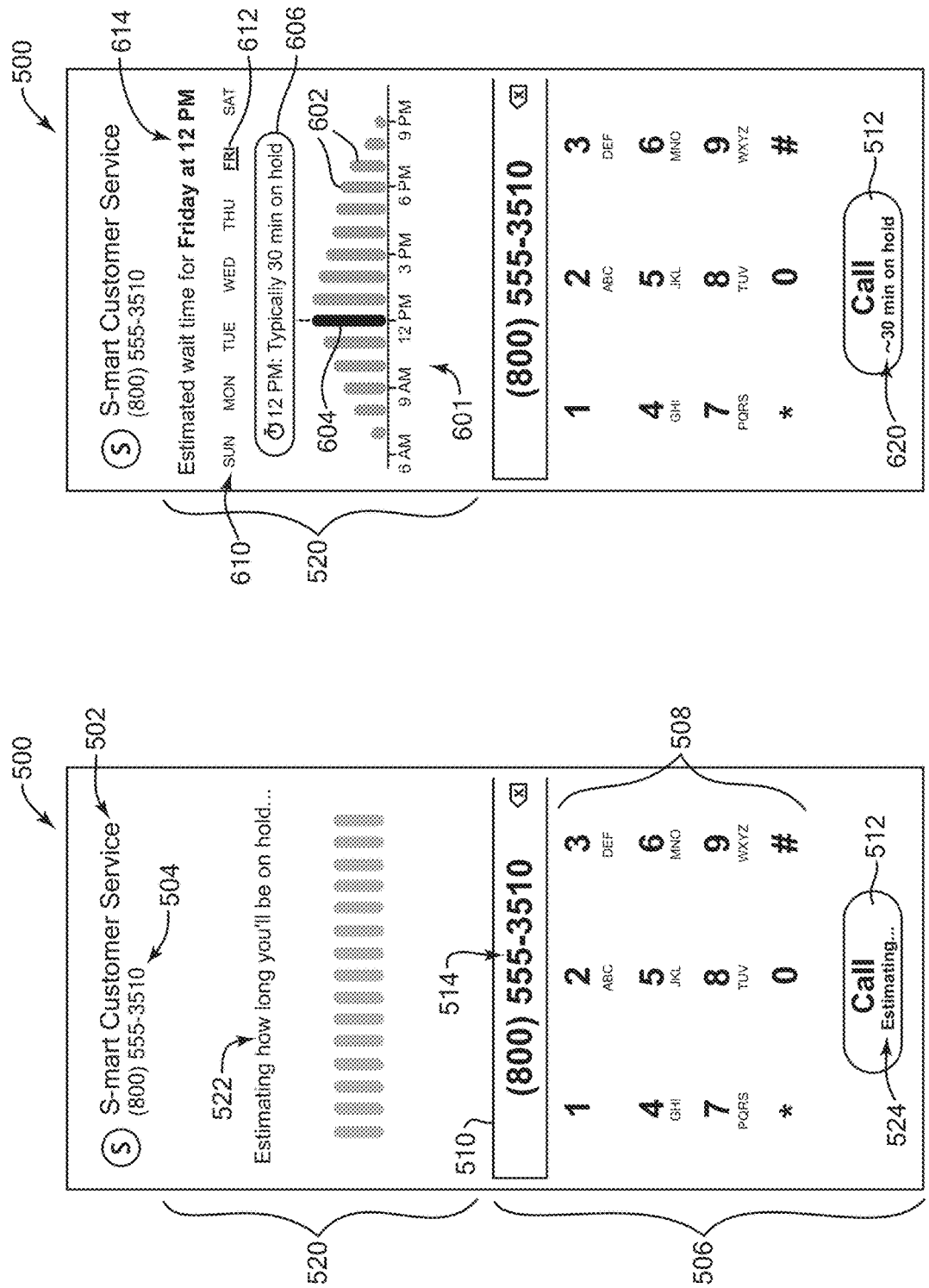
FIGS. 5-8 are diagrammatic illustrations of a user interface displayed by a call device in which hold durations for prospective calls are displayed prior to initiating a call, according to some implementations.

FIG. 5 is a diagrammatic illustration of an example user interface 500 displayed by a display screen of a call device in which hold durations for a call can be displayed, according to some implementations. For example, interface 500 can be displayed on a touchscreen by a client device, e.g., one of client devices 120-126 as shown in FIG. 1, or a display device of a different device such as a server device, e.g., server system 102.

In some implementations, user interface 500 can be associated with a call application program that initiates calls to other devices, answers incoming calls from other devices, and communicates with other devices via a call connection. In this example, a name 502 of a target entity is displayed, the target entity having been selected by a user. An entity identifier 504 of the target entity is displayed near entity name 502. A call interface 506 is also displayed, which includes a standard numeric keypad 508, an identifier entry field 510, and a call control 512. The keys of numeric keypad 508 can be selected by a user (e.g., via a touchscreen or other input device) to enter an identifier 514 in entry field 510, e.g., one character at a time, or multiple characters in other implementations. In some implementations, identifier 514 can be entered automatically in entry field 510 by the call device, e.g., in response to the user selecting to call the target entity from a different application (e.g., a map application, a web browser, etc.), which causes interface 500 to be displayed by the call device. Call control 512, if selected by the user, can cause the call device to dial the identifier 514 of the target entity and initiate a call to the target entity.

User interface 500 can also include a hold duration display area 520, where information related to estimated hold durations can be displayed. In this example, a message 522 is displayed in display area 520 that indicates that estimated hold durations are in process of being determined for entity identifier 504/514. This is a pre-call determination of hold durations, e.g., prior to a call being initiated to the target entity using identifier 514 (and in this example, prior to call control 512 being selected by the user). In some implementations, a message 524 can also be displayed in or associated with the call control 512, e.g., to indicate hold durations are being determined.

FIG. 6 is a diagrammatic illustration of the user interface 500 of FIG. 5 in which hold durations are displayed after being determined by the call device, according to some implementations. This display example is prior to initiation of a call to the target entity using identifier 514. The hold durations can be estimated using any of the techniques described herein. In this example, multiple hold durations are estimated for multiple prospective calls, each call at a different call time. For example, a respective hold duration has been estimated by the call device for a call at each hour (7 AM, 8 AM, etc.) of the time period in which the target entity is open for business and able to provide a human agent to talk to a caller. These include prospective call times after the current time. Hold durations for call times prior to the current time can be displayed for reference, and/or can be indications of estimated hold durations occurring at these same call times on the following day, in some implementations.

At least some of the determined hold durations are graphically displayed in a bar graph 601 in display area 520, e.g., the height of each vertical bar 602 indicating the magnitude of the hold duration relative to magnitudes of other estimated hold durations being displayed. In this example, a selected bar 604 is highlighted with a different color, brightness, or other indication to distinguish it visually from the other bars 602, and indicates a hold duration for a particular call, which in this example is a call placed within a time period that includes the current time (e.g., the current time is closest to the time period associated with this bar). In addition, a hold duration indication 606 is visually associated with the selected bar 604 and indicates in text format the hold duration indicated by the selected bar 604.

In some implementations, if holding durations are displayed for a single day as shown, a set of day labels 610 can be displayed in display area 520 near, or otherwise in visual association with, the bar graph 601. In this example, each label 610 indicates a different day of the week. One label 612 of the labels 610 is highlighted to indicate the day for which the hold durations of bar graph 601 apply. For example, label 612 can be displayed in bold, underlined, and/or be otherwise visually distinguished from the other labels 610. In some implementations, other user-selectable labels can be displayed, e.g., the current month with selectable remaining days, the current year with selectable remaining months, etc.

In some implementations, a summary message 614 can be displayed in display area 520, e.g., in visual association with bar graph 501 (e.g., adjacent to or near bar graph 501). Summary message 614 can summarize the information indicated in bar graph 601, e.g., display in text format the estimated hold duration for a call initiated at the selected call time in bar graph 601 or within a particular period of time in advance of and/or following the selected call time. For example, in FIG. 6 the selected call time is a current time (or a time immediately after the current time), and message 614 can indicate the call time associated with the selected bar 604 (e.g., 12 PM in this example). For example, the call time in message 614 can be the call time that represents a time period that includes the current time. In some examples, the time period represented by a bar 602 can be one hour centered on the displayed call time for that bar, or can be other time periods in other implementations. When the current time advances to the next time period represented by the next bar 602, the selected bar 604 and message 614 can be updated accordingly. For example, the selected bar 604 and message 614 can be changed to the next call time of bar graph 601 (e.g., 1 PM) when the current time advances to the next time period (e.g., at 12:31 PM, in one example).

In some implementations, a message 620 can also be displayed in or associated with the call control 512 that indicates the estimated hold duration associated with the selected call time of bar 604 in bar graph 601.

Figures 7, 8:
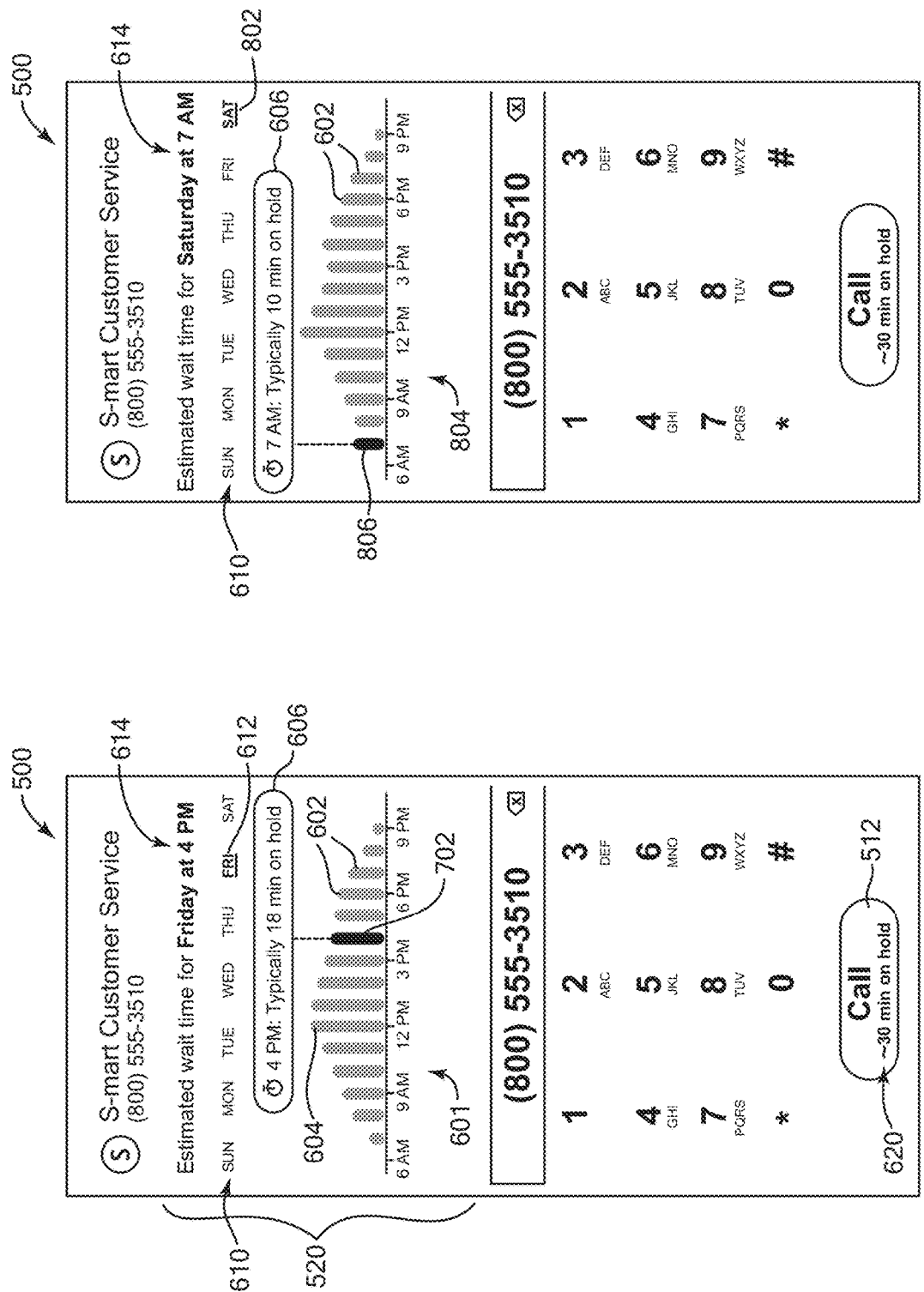

FIG. 7 is a diagrammatic illustration of the user interface 500 of FIG. 6 showing an example of a different estimated hold duration selected by the user, according to some implementations. Interface 500 of FIG. 7 is displayed prior to initiation of a call to the target entity using identifier 514. In this example, the user has selected a different bar 702 of bar graph 601 via user input, e.g., tapping on the displayed bar 702 on a touchscreen. Bar 702 is correspondingly visually highlighted in response to the selection, and previously-selected bar 604 is no longer highlighted. The hold duration indication 606 is updated in response to the selection to indicate the estimated holding duration represented by the selected bar 702.

FIG. 8 is a diagrammatic illustration of the user interface 500 of FIG. 7 in which a different estimated hold duration is selected by the user, according to some implementations. Interface 500 of FIG. 8 is displayed prior to initiation of a call to the target entity using identifier 514. In this example, the user has selected a different day of the week (not the current day) to view hold durations for prospective calls on the selected day. For example, the user can select a day label 610 to cause hold durations associated with the selected day to be displayed. In some examples, the label 802 (for the next upcoming Saturday) is selected by the user in FIG. 8, causing bar graph 804 to be displayed. Bar graph 804 includes a different set of hold durations for calls as compared to bar graph 601 for Friday shown in FIGS. 6 and 7. In some implementations, if a day is selected for which the target entity is not available to receive calls (e.g., no business hours on a weekend day, holiday, etc.), a bar graph of hold durations is not displayed and is replaced by a message indicating that the target entity is not connecting a human agent to a call on that day (e.g., if Sunday is selected for a label 610, a message "closed on Sundays" can be displayed).

Bar graph 804 includes estimated hold durations at different call times on the selected day, similarly to bar graph 601 of FIGS. 6 and 7. A bar 806 of bar graph 804 is selected. For example, bar 806 may have been selected by user input, or may be a default selection when a different day label 610 is selected (e.g., the first or earliest bar in bar graph 804 can be selected). Bar 806 is correspondingly visually highlighted, and previously-selected bar 702 is no longer highlighted. The hold duration indication 606 is updated in response to the selection to indicate the estimated holding duration represented by the selected bar 806.

In other implementations, hold durations can be displayed in other ways or formats. For example, horizontal bar graphs, color-coded numbers or areas, a calendar format, or other graphical displays can be used.

Figures 9, 10:
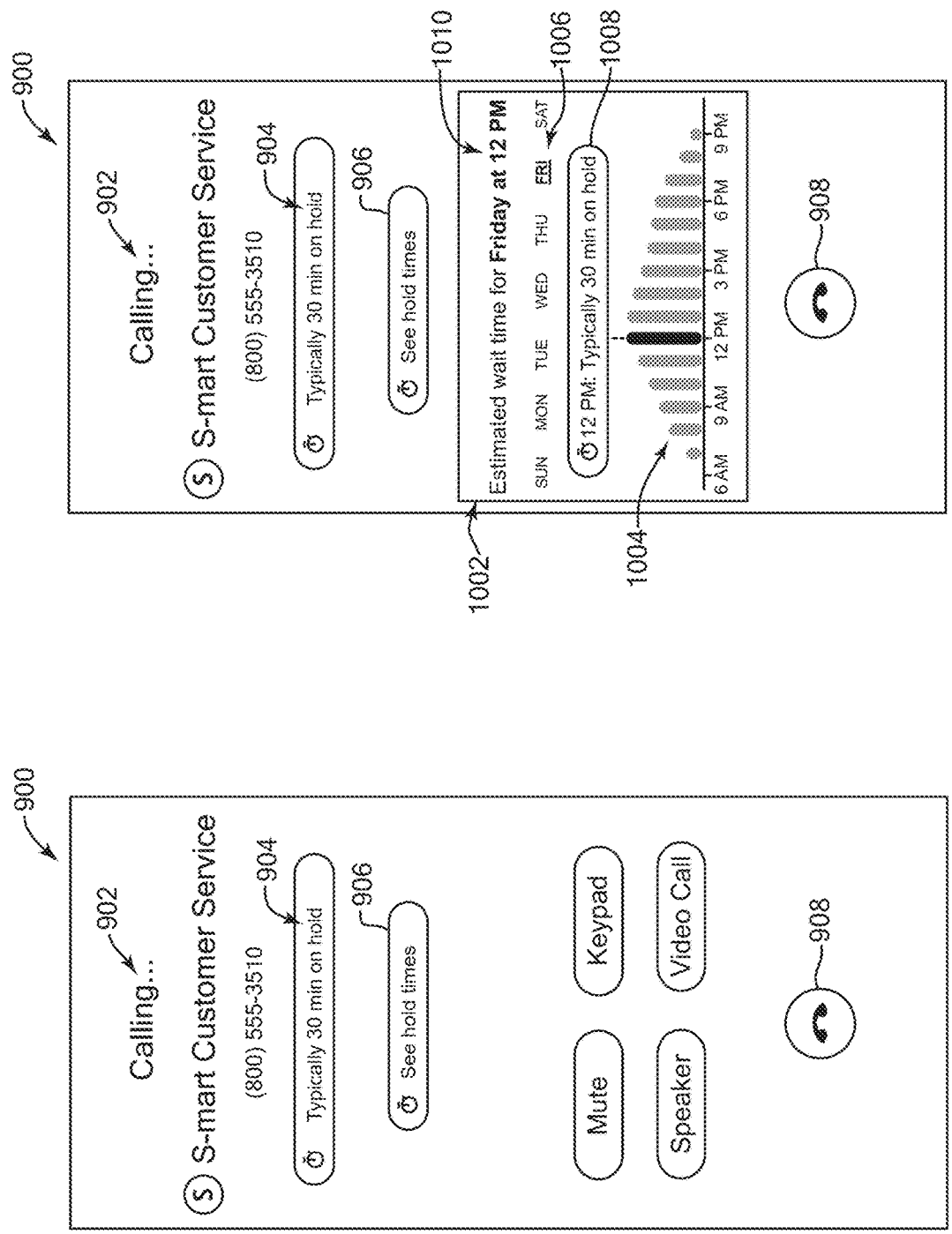
FIGS. 9 and 10 are diagrammatic illustrations of a user interface displayed by a call device in which hold durations for prospective calls are displayed during a call, according to some implementations.

FIG. 9 is a diagrammatic illustration of an example user interface 900 displayed by a display screen of a call device in which hold durations can be displayed during a call, according to some implementations. For example, interface 900 can be displayed on a touchscreen by a client device, e.g., one of client devices 120-126 as shown in FIG. 1, or a display device of a different device such as a server device, e.g., server system 102.

Interface 900 can be a calling interface that is displayed by a call device that has initiated a call to a target entity by dialing an entity identifier for the target entity. For example, the status 902 of the call is indicated. An estimated hold duration 904 is determined for the current call (e.g., as described herein) and can be displayed in interface 900. In addition, a hold duration control 906 is displayed and can be selected by the user to cause hold durations to be displayed for prospective calls to the target entity at different call times. A disconnect control 908 can be selected by the user to hang up the current call.

In some implementations, a similar interface to interface 900 can be displayed after the call connects to the target entity. For example, estimated hold duration 904 and hold duration control 906 can continue to be displayed in the interface 900 while the caller and callee are communicating via voice in the call. Estimated hold duration 904 can also continue to be displayed if the user is put on hold by the target entity. For example, speech recognition techniques, receiving user selection, or other techniques can be used by the call device to detect if the target entity (e.g., an automated voice menu of the target entity) has put the user on hold. While on hold, the estimated hold duration 904 can be adjusted, e.g., reduced as the time of the hold period progresses. The hold duration control 906 can be displayed and available for selection by the user during the call and/or while on hold.

FIG. 10 is a diagrammatic illustration of the user interface 900 of FIG. 9 in which hold durations for prospective calls have been determined by the call device and are displayed in interface 900 during a call, according to some implementations. In this example, a hold duration display area 1002 is displayed in interface 900, where display area 1002 includes a bar graph 1004 showing hold durations for multiple prospective calls. For example, display area 1002 can be displayed in response to the user selecting hold duration control 906 as shown in FIG. 9, or other input can be received to cause display area 1002 to be displayed.

Bar graph 1004 can be similar to bar graphs described above with respect to FIGS. 6-8. For example, multiple hold durations can be estimated for multiple prospective calls, each prospective call having a different call time. A user can select a day label 1006 to display hold durations for the selected day, similarly as described above. A hold duration indication 1008 can indicate in text format a selected hold duration similarly as described above. In some implementations, a summary message 1010 can be displayed in display area 1002, e.g., in visual association with bar graph 1004 similarly as described above.

In some implementations, bar graph 1004 can continue to be displayed and be responsive to user selection when the call is connected and during the call, e.g., when caller and callee are speaking, caller is on hold, etc.

Figure 11:
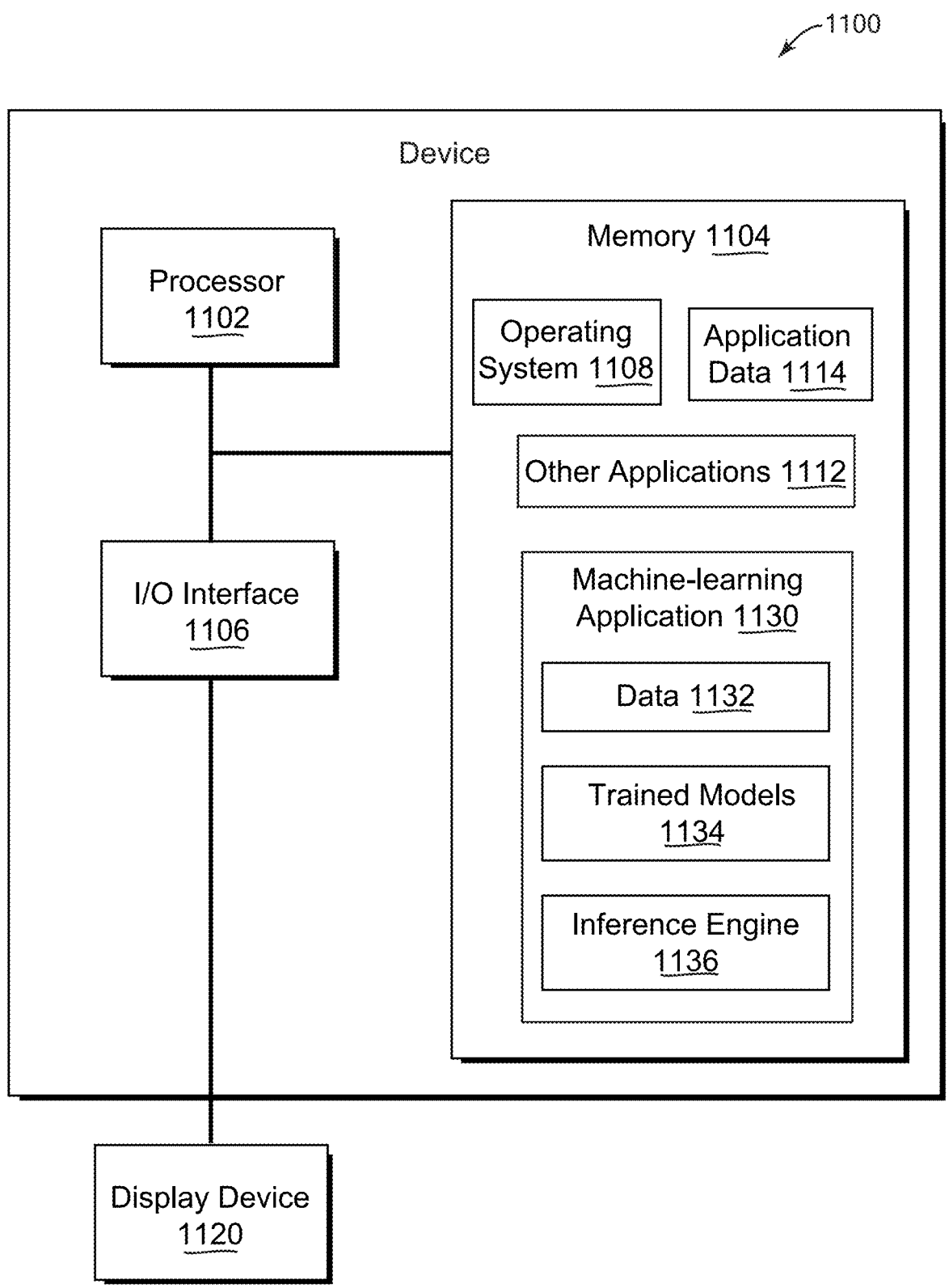
FIG. 11 is a block diagram of an example device which may be used for one or more implementations described herein.

FIG. 11 is a block diagram of an example device 1100 which may be used to implement one or more features described herein. In one example, device 1100 may be used to implement a client device, e.g., any of client devices 120-126 shown in FIG. 1. Alternatively, device 1100 can implement a server device, e.g., server device 104, etc. In some implementations, device 1100 may be used to implement a client device, a server device, or a combination of the above. Device 1100 can be any suitable computer system, server, or other electronic or hardware device as described herein.

In some implementations, device 1100 includes a processor 1102, a memory 1104, and I/O interface 1106. Processor 1102 can be one or more processors and/or processing circuits to execute program code and control basic operations of the device 1100. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 1102 may include one or more co-processors that implement neural-network processing. In some implementations, processor 1102 may be a processor that processes data to produce probabilistic output, e.g., the output produced by processor 1102 may be imprecise or may be accurate within a range from an expected output. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108, machine-learning application 1130, other applications 1112, and application data 1114. Other applications 1112 may include applications such as a data display engine, a communication application (e.g., dialer or call application), web hosting engine, image display engine, notification engine, social networking engine, etc. In some implementations, the machine-learning application 1130 and/or other applications 1112 can each include instructions that enable processor 1102 to perform functions described herein, e.g., some or all of the methods of FIGS. 2, 3, and/or 4. Application data 1114 can include call characteristics including call times, call durations, hold durations, and other characteristics of previous calls, and/or data structures (e.g., tables, lists, graphs) that can be used to determine estimated hold durations as described herein.

The machine-learning application 1130 can include one or more named-entity recognition (NER) implementations for which supervised and/or unsupervised learning can be used. The machine learning models can include multi-task learning based models, residual task bidirectional LSTM (long short-term memory) with conditional random fields, statistical NER, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 1130 may utilize Bayesian classifiers, support vector machines, neural networks, or other learning techniques. In some implementations, machine-learning application 1130 may include trained models 1134, an inference engine 1136, and data 1132. In some implementations, data 1132 may include training data, e.g., data used to generate trained models 1134. For example, training data may include any type of data suitable for training a model for determining hold durations for calls, such as a call characteristics of previous calls by users (if user consent has been obtained), etc. Training data may be obtained from any source, e.g., a data repository specifically marked for training, data for which permission is provided for use as training data for machine-learning, etc. In implementations where one or more users permit use of their respective user data to train a machine-learning model, e.g., trained models 1134, training data may include such user data. In implementations where users permit use of their respective user data, data 1132 may include permitted data.

In some implementations, training data may include synthetic data generated for the purpose of training, such as data that is not based on user input or activity in the context that is being trained, e.g., data generated from simulations or models, etc. In some implementations, machine-learning application 1130 excludes data 1132. For example, in these implementations, the trained models 1134 may be generated, e.g., on a different device, and be provided as part of machine-learning application 1130. In various implementations, the trained models 1134 may be provided as a data file that includes a model structure or form, and associated weights. Inference engine 1136 may read the data file for trained model 1134 and implement a neural network with node connectivity, layers, and weights based on the model structure or form specified in trained models 1134.

Machine-learning application 1130 also includes one or more trained models 1134. For example, such models can include trained models for determining estimated hold durations for calls as described herein. In some implementations, the trained models 1134 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 1132 or application data 1114. Such data can include, for example, call characteristics of previous calls and/or feedback from users regarding previous calls and estimates of hold durations, e.g., when a trained model is used for determining hold durations. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of hold durations at prospective call times to be provided in an interface. In some implementations, model form or structure also specifies a number and/or type of nodes in each layer.

In different implementations, one or more trained models 1134 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, one or more trained models 1134 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1132, to produce a result.

For example, training may include applying supervised learning techniques. In supervised learning, the training data can include a plurality of inputs (e.g., call characteristics) and a corresponding expected output for each input (e.g., a set of hold durations at different call times). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to determine or cluster call characteristics that are similar to each other.

In another example, a model trained using unsupervised learning may cluster calls or words based on the use of the calls or words in data sources. In some implementations, unsupervised learning may be used to produce knowledge representations, e.g., that may be used by machine-learning application 1130. In various implementations, a trained model includes a set of weights, or embeddings, corresponding to the model structure. In implementations where data 1132 is omitted, machine-learning application 1130 may include trained models 1134 that are based on prior training, e.g., by a developer of the machine-learning application 1130, by a third-party, etc. In some implementations, one or more of trained models 1134 may each include a set of weights that are fixed, e.g., downloaded from a server that provides the weights.

Machine-learning application 1130 also includes an inference engine 1136. Inference engine 1136 is configured to apply the trained models 1134 to data, such as application data 1114, to provide inferences such as a set of hold durations for different call times. In some implementations, inference engine 1136 may include software code to be executed by processor 1102. In some implementations, inference engine 1136 may specify circuit configuration (e.g., for a programmable processor, for a field programmable gate array (FPGA), etc.) enabling processor 1102 to apply the trained model. In some implementations, inference engine 1136 may include software instructions, hardware instructions, or a combination. In some implementations, inference engine 1136 may offer an application programming interface (API) that can be used by operating system 1108 and/or other applications 1112 to invoke inference engine 1136, e.g., to apply trained models 1134 to application data 1114 to generate an inference.

Machine-learning application 1130 may provide several technical advantages. For example, when trained models 1134 are generated based on unsupervised learning, trained models 1134 can be applied by inference engine 1136 to produce knowledge representations (e.g., numeric representations) from input data, e.g., application data 1114. For example, a model trained for determining hold durations may produce representations of hold durations. In some implementations, such representations may be helpful to reduce processing cost (e.g., computational cost, memory usage, etc.) to generate an output (e.g., a label, a classification, an estimated characteristic, etc.). In some implementations, such representations may be provided as input to a different machine-learning application that produces output from the output of inference engine 1136.

In some implementations, knowledge representations generated by machine-learning application 1130 may be provided to a different device that conducts further processing, e.g., over a network. In such implementations, providing the knowledge representations rather than data may provide a technical benefit, e.g., enable faster data transmission with reduced cost.

In some implementations, machine-learning application 1130 may be implemented in an offline manner. In these implementations, trained models 1134 may be generated in a first stage, and provided as part of machine-learning application 1130. In some implementations, machine-learning application 1130 may be implemented in an online manner. For example, in such implementations, an application that invokes machine-learning application 1130 (e.g., operating system 1108, one or more of other applications 1112) may utilize an inference produced by machine-learning application 1130, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained models 1134, e.g., to update embeddings for trained models 1134.

In some implementations, machine-learning application 1130 may be implemented in a manner that can adapt to particular configuration of device 1100 on which the machine-learning application 1130 is executed. For example, machine-learning application 1130 may determine a computational graph that utilizes available computational resources, e.g., processor 1102. For example, if machine-learning application 1130 is implemented as a distributed application on multiple devices, machine-learning application 1130 may determine computations to be carried out on individual devices in a manner that optimizes computation. In another example, machine-learning application 1130 may determine that processor 1102 includes a GPU with a particular number of GPU cores (e.g., 1000) and implement the inference engine accordingly (e.g., as 1000 individual processes or threads).

In some implementations, machine-learning application 1130 may implement an ensemble of trained models. For example, trained models 1134 may include a plurality of trained models that are each applicable to same input data. In these implementations, machine-learning application 1130 may choose a particular trained model, e.g., based on available computational resources, success rate with prior inferences, etc. In some implementations, machine-learning application 1130 may execute inference engine 1136 such that a plurality of trained models is applied. In these implementations, machine-learning application 1130 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1108 or one or more other applications 1112.

In different implementations, machine-learning application 1130 can produce different types of outputs. In some implementations, machine-learning application 1130 may produce an output based on a format specified by an invoking application, e.g., operating system 1108 or one or more other applications 1112. In some implementations, an invoking application may be another machine-learning application. For example, such configurations may be used in generative adversarial networks, where an invoking machine-learning application is trained using output from machine-learning application 1130 and vice-versa.

Any of software in memory 1104 can alternatively be stored on any other suitable storage location or computer-readable medium. In addition, memory 1104 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 1104 and any other type of storage (magnetic disk, optical disk, magnetic tape, or other tangible media) can be considered "storage" or "storage devices."

I/O interface 1106 can provide functions to enable interfacing the server device 1100 with other systems and devices. Interfaced devices can be included as part of the device 1100 or can be separate and communicate with the device 1100. For example, network communication devices, storage devices (e.g., memory 1104 and/or database 106), and input/output devices can communicate via I/O interface 1106. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 1106 can include one or more display devices 1120 and one or more data stores 1138 (as discussed above). The display devices 1120 that can be used to display content, e.g., a user interface of an output application as described herein. Display device 1120 can be connected to device 1100 via local connections (e.g., display bus) and/or via networked connections and can be any suitable display device. Display device 1120 can include any suitable display device such as an LCD, LED, or plasma display screen, CRT, television, monitor, touchscreen, 3-D display screen, or other visual display device. For example, display device 1120 can be a flat display screen provided on a mobile device, multiple display screens provided in a goggles or headset device, a projector, or a monitor screen for a computer device.

The I/O interface 1106 can interface to other input and output devices. Some examples include display devices, printer devices, scanner devices, etc. Some implementations can provide a microphone for capturing sound, voice commands, etc., audio speaker devices for outputting sound, or other input and output devices.

For ease of illustration, FIG. 11 shows one block for each of processor 1102, memory 1104, I/O interface 1106, and software blocks 1108, 1112, and 1130. These blocks may represent one or more processors or processing circuitries, operating systems, memories, I/O interfaces, applications, and/or software modules. In other implementations, device 1100 may not have all of the components shown and/or may have other elements including other types of elements instead of, or in addition to, those shown herein. While some components are described as performing blocks and operations as described in some implementations herein, any suitable component or combination of components of environment 100, device 1100, similar systems, or any suitable processor or processors associated with such a system, may perform the blocks and operations described.

Although the description has been described with respect to particular implementations, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's or user device's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   obtaining an identifier of a target entity, the identifier being usable by a first call device to initiate a call between the first call device and the target entity;
   determining a hold duration that is an estimated amount of time before the call is matched to a human agent when the call is initiated at a particular time that is prospective to a current time, wherein the hold duration is determined based on a plurality of previous calls between one or more call devices and the target entity, wherein the hold duration is determined based on one of a machine learning model or estimated hold durations for entities stored in a data structure, wherein the machine learning model receives inputs including the identifier and a time of the call, and outputs a result indicating an estimated hold duration for the call, wherein the machine learning model is trained based on training data including identifiers, initiation times of the previous calls, call durations of the previous calls, and hold durations of the previous calls, and wherein the estimated hold durations are based on the plurality of previous calls; and
   providing the hold duration to be displayed by the first call device prior to the initiation of the call between the first call device and the target entity.

2. The computer-implemented method of claim 1, wherein obtaining the identifier, determining the hold duration, and providing the hold duration to be displayed are performed by a server device in communication with the first call device, wherein obtaining the identifier includes receiving the identifier at the server device from the first call device that has received the identifier based on user input to the first call device, and wherein providing the hold duration to be displayed includes sending the hold duration from the server device to the first call device to be displayed by the first call device.

3. The computer-implemented method of claim 1, wherein obtaining the identifier, determining the hold duration, and providing the hold duration to be displayed are performed by the first call device, and wherein determining the hold duration includes:
   accessing a data structure that stores hold durations or a machine learning model stored in local storage of the first call device that outputs hold durations in response to inputs including the target entity and the particular time.

4. The computer-implemented method of claim 1, wherein obtaining the identifier, determining the hold duration, and providing the hold duration to be displayed are performed by the first call device, and wherein determining the hold duration includes:
   requesting the hold duration from a server device over a communication network;
   sending the identifier from the first call device to a server device that determines the hold duration based on the identifier, and
   receiving the hold duration at the first call device from the server device prior to the initiation of the call between the first call device and the target entity,
   wherein requesting the hold duration is performed prior to obtaining a complete version of the identifier of the target entity.

5. The computer-implemented method of claim 1, wherein the one or more call devices are a plurality of call devices associated with a plurality of users.

6. The computer-implemented method of claim 1, wherein the hold duration is determined based on:
   call duration data that indicates a plurality of call durations of the plurality of previous calls between the one or more call devices and the target entity; and
   hold duration data that indicates a plurality of hold durations of the previous calls.

7. The computer-implemented method of claim 6, wherein the plurality of previous calls have call durations that are greater than a threshold duration and exclude calls that have call durations less than the threshold duration, and wherein one or more hold durations of the plurality of hold durations are based on corresponding call durations of the call durations that are greater than the threshold duration.

8. The computer-implemented method of claim 7, wherein the one or more hold durations of the plurality of hold durations are determined based on a function that estimates the one or more hold durations based on the call durations of the one or more previous calls, wherein the threshold duration and the function are customized for the target entity associated with the identifier.

9. The computer-implemented method of claim 1, further comprising causing the particular time to be displayed by the first call device in association with display of the hold duration, wherein the particular time is at least one day in advance of the current time.

10. The computer-implemented method of claim 1, further comprising:
    determining a plurality of hold durations for a plurality of prospective calls, the plurality of hold durations including the hold duration, wherein each of the plurality of hold durations indicates a respective estimated amount of time before an associated prospective call is matched to the human agent when the associated prospective call is initiated at a respective call time in advance of the current time, and wherein the respective call times are different from each other; and
    causing the plurality of hold durations to be displayed in association with their respective call times.

11. The computer-implemented method of claim 10, further comprising:
    receiving user input that selects a prospective call having a particular hold duration of the plurality of hold durations and a particular call time associated with the particular hold duration; and
    scheduling the selected prospective call at the particular call time in a calendar associated with the first call device.

12. The computer-implemented method of claim 11, further comprising causing a notification to be output by the first call device that indicates the particular call time is approaching or has arrived.

13. The computer-implemented method of claim 11, further comprising automatically initiating, by the first call device, the call between the first call device and the target entity at the particular call time.

14. The computer-implemented method of claim 1, wherein causing the hold duration to be displayed is performed during a first call between the first call device and the target entity, wherein the call between the first call device and the target entity is a second call, and wherein the first call is initiated prior to causing the initiation of the second call between the first call device and the target entity.

15. The computer-implemented method of claim 1, further comprising: causing a prompt for user feedback to be displayed after termination of the call between the first call device and the target entity; receiving the user feedback indicating a degree of accuracy of the hold duration; and updating a data structure or a model used to determine the hold duration based on the user feedback.

16. A system to provide hold duration estimates for calls, the system comprising:
a memory storing instructions; and
at least one processor coupled to the memory, the at least one processor configured to access the instructions from the memory to perform operations comprising:
obtaining an identifier of a target entity, the identifier being usable by a first call device to initiate a call between the first call device and the target entity;
determining a hold duration that is an estimated amount of time before the call is matched to a human agent when the call is initiated at a particular time that is prospective to a current time, wherein the hold duration is determined based on a plurality of previous calls between one or more call devices and the target entity, wherein the hold duration is determined based on one of a machine learning model or estimated hold durations for entities stored in a data structure, wherein the machine learning model receives inputs including the identifier and a time of the call, and outputs a result indicating an estimated hold duration for the call, wherein the machine learning model is trained based on training data including identifiers, initiation times of the previous calls, call durations of the previous calls, and hold durations of the previous calls, and wherein the estimated hold durations are based on the plurality of previous calls; and
providing the hold duration to be displayed by the first call device prior to the initiation of the call between the first call device and the target entity.

17. The system of claim 16, wherein the operation of determining the hold duration is based on:
call duration data that indicates a plurality of call durations of the plurality of previous calls between the one or more call devices and the target entity; and
hold duration data that indicates a plurality of hold durations of the previous calls.

18. The system of claim 16, wherein the at least one processor performs further operations comprising:
determining a plurality of hold durations including the hold duration, wherein each of the plurality of hold durations indicates a respective estimated amount of time before the call is matched to the human agent when the call is initiated at a respective call time prospective to the current time, and wherein the respective call times are different from each other; and
causing the plurality of hold durations to be displayed in association with their respective call times.

19. A non-transitory computer readable medium having stored thereon instructions that, when executed by a processor, cause the processor to:
obtain an identifier of a target entity, the identifier being usable by a first call device to initiate a call between the first call device and the target entity;
determine a hold duration that is an estimated amount of time before the call is matched to a human agent when the call is initiated at a particular time that is prospective to a current time, wherein the hold duration is determined based on a plurality of previous calls between a plurality of call devices and the target entity, wherein the hold duration is determined based on one of a machine learning model or estimated hold durations for entities stored in a data structure, wherein the machine learning model receives inputs including the identifier and a time of the call, and outputs a result indicating an estimated hold duration for the call, wherein the machine learning model is trained based on training data including identifiers, initiation times of the previous calls, call durations of the previous calls, and hold durations of the previous calls, and wherein the estimated hold durations are based on the plurality of previous calls; and
provide the hold duration to be displayed by the first call device prior to the initiation of the call between the first call device and the target entity.

* * * * *